United States Patent
Ra

(10) Patent No.: US 12,159,462 B2
(45) Date of Patent: Dec. 3, 2024

(54) NETWORK SERVER AND METHOD FOR CONTROLLING USER TERMINAL ASSOCIATED WITH DOORBELL INCLUDING CAMERA

(71) Applicant: HANWHA TECHWIN CO., LTD., Seongnam-si (KR)

(72) Inventor: Woowon Ra, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 426 days.

(21) Appl. No.: 17/570,390

(22) Filed: Jan. 7, 2022

(65) Prior Publication Data

US 2022/0139088 A1    May 5, 2022

Related U.S. Application Data

(63) Continuation-in-part of application No. PCT/KR2019/010585, filed on Aug. 20, 2019.

(30) Foreign Application Priority Data

Jul. 12, 2019    (KR) .................. 10-2019-0084305

(51) Int. Cl.
*G06V 20/52* (2022.01)
*G06V 40/16* (2022.01)
(Continued)

(52) U.S. Cl.
CPC ............ *G06V 20/52* (2022.01); *G06V 40/172* (2022.01); *H04N 7/186* (2013.01); *G06V 2201/07* (2022.01); *G07C 9/00563* (2013.01)

(58) Field of Classification Search
CPC ....... G06V 40/172–173; G06V 40/179; G06V 40/166; G06V 20/52; G06V 2201/07; G07C 9/00563; H04N 7/186
See application file for complete search history.

(56) References Cited

U.S. PATENT DOCUMENTS

| | | | |
|---|---|---|---|
| 2007/0176739 A1* | 8/2007 | Raheman | G07C 9/00904 713/176 |
| 2015/0363989 A1* | 12/2015 | Scalisi | H04N 7/188 340/5.7 |
| 2019/0087646 A1* | 3/2019 | Goulden | G06T 7/70 |

FOREIGN PATENT DOCUMENTS

| | | |
|---|---|---|
| JP | 2007-025802 A | 2/2007 |
| KR | 10-1268432 B1 | 5/2013 |

(Continued)

OTHER PUBLICATIONS

Written Opinion of the ISA dated Apr. 10, 2020 for international application No. PCT/KR2019/010585.
(Continued)

*Primary Examiner* — Geoffrey E Summers
(74) *Attorney, Agent, or Firm* — McLean IP Global; Jason Y. Pahng

(57) ABSTRACT

A method for controlling a user terminal associated with a doorbell including a camera according to an embodiment of the present invention includes: storing, in a database, feature data units collected using the doorbell; generating one among a plurality of types of commands according to whether an object detected from an image of a visitor captured by the doorbell matches one of the feature data units; and displaying first and second graphic interfaces, which are different from each other, on the user terminal in responses to first and second commands, respectively, among the commands.

11 Claims, 19 Drawing Sheets

(51) Int. Cl.
*G07C 9/00* (2020.01)
*H04N 7/18* (2006.01)

(56) References Cited

FOREIGN PATENT DOCUMENTS

| KR | 10-1781054 B1 | 9/2017 |
| KR | 10-2017-0131941 A | 12/2017 |
| KR | 10-2019-0038769 A | 4/2019 |
| KR | 10-2019-0069925 A | 6/2019 |

OTHER PUBLICATIONS

International Search Report dated Apr. 10, 2020 for international application No. PCT/KR2019/010585.

* cited by examiner

NETWORK SERVER AND METHOD FOR CONTROLLING USER TERMINAL ASSOCIATED WITH DOORBELL INCLUDING CAMERA

CROSS-REFERENCE TO RELATED APPLICATIONS

This application is a continuation-in-part of international patent application number PCT/KR2019/010585, filed on Aug. 20, 2019, which is hereby incorporated by reference in its entirety. In addition, this application claims priority from Korean application number 10-2019-0084305 filed on Jul. 12, 2019, which is hereby incorporated by reference in its entirety.

BACKGROUND OF THE DISCLOSURE

Field of the Disclosure

The present disclosure relates to a network server and an operating method thereof, and more particularly, to a network server and method for controlling a user terminal associated with a doorbell including a camera.

Related Art

In general, door locks are installed on doors of houses, officetels, offices, or the like to control an access of outsiders, and as examples of the door locks, various products such as a mechanical door lock using a bar key, a card/semiconductor key door lock using a card or semiconductor key, A variety of products are being used, digital door locks with numeric key input, and door locks combined with such methods have been used.

Recently, methods for unlocking a door lock using a wireless signal have been proposed. To this end, the door lock includes a wireless communication module, and an internal controller verifies a wireless signal, and performs locking and unlocking using the wireless signal according to the verification result. Even if a user are located in a remote location, he/she may control the locking and unlocking of the door lock through a terminal for providing a wireless signal, and thus, the user convenience may be improved. However, the control of the door lock requires a high security level, and therefore, the control of the door lock at a remote location has a security issue.

The above description is only for helping the understanding of the background of the technical ideas of the present disclosure, and therefore, cannot be understood as content corresponding to the prior art known to those skilled in the art of the present disclosure.

SUMMARY

The present disclosure provides a network server and an operating method thereof capable of providing improved security and user convenience for control of a door lock. For example, the network server and operating method thereof enable a user to check a real-time video captured by a doorbell through a user terminal and then select unlocking of a door lock, and may prevent unlocking of the door lock from being accidentally and unintentionally.

In an aspect, a method for controlling a user terminal associated with a doorbell including a camera includes: storing, in a database, feature data units collected using the doorbell; generating one among a plurality of types of commands according to whether an object detected from an image of a visitor captured by the doorbell matches one of the feature data units; and displaying first and second graphic interfaces, which are different from each other, on the user terminal in responses to first and second commands, respectively, among the commands, in which the first graphic interface includes a real-time video captured by the camera of the doorbell, a first item for selecting a call with the visitor through communication between the user terminal and the doorbell, and a second item for controlling a lock of a door lock installed adjacent to the doorbell, the door lock communicates with the doorbell through short range wireless communication, the second graphic interface includes the real-time video captured by the doorbell and the first item, and after the first item of the second graphic interface is selected, the second graphic interface is switched to a third graphic interface including the second item.

The method may further include: transmitting a control signal for unlocking the door lock to the door lock through the doorbell when the second item is selected.

The transmitting of the control signal may include: transmitting an instant key value to the door lock as the control signal through the doorbell; and transmitting a password corresponding to the instant key value to a client terminal corresponding to the visitor.

The method may further include: in the door lock, verifying a password received through a user interface of the door lock based on the instance key value to unlock the door lock.

The generating of the one of the plurality of types of commands may include: generating a first command when the detected object matches one of the feature data units; and generating the second command when the detected object does not match one of the feature data units.

The method may further include: in response to a third command among the commands, transmitting a mode control signal for controlling the door lock to unlock the door lock based on a registered password to the door lock through the doorbell.

The method may further include: receiving an object registration signal in association with at least some of the feature data units. The generating of the one of the plurality of types of commands includes generating the third command when the detected object matches one of the feature data units and the object registration signal is received in association with the matched feature data unit.

The third graphic interface may be displayed in response to termination of the call with the visitor.

The third graphic interface may include the real-time video captured by the doorbell, the first item, and the second item.

Another aspect of the present invention relates to a network server communicating with a doorbell including a camera and a user terminal associated with the doorbell. A network server communicating with a doorbell including a camera and a user terminal associated with the doorbell includes: a communicator configured to be connected to the network; and at least one processor configured to communicate with the user terminal connected to the network through the communicator, in which the at least one processor stores, in a database, feature data units collected using the doorbell, and generates one among a plurality of types of commands according to whether an object detected from an image of a visitor captured by the doorbell matches one of the feature data units and transmits the generated command to the user terminal through the communicator, first and second commands among the commands control the user terminal to display first and second graphic interfaces, respectively, the first graphic interface includes a real-time video captured by the camera of the doorbell, a first item for selecting a call with the visitor through communication between the user terminal and the doorbell, and a second item for controlling a lock of a door lock installed adjacent to the doorbell, the door lock communicates with the doorbell through short range wireless communication, the second graphic interface includes the real-time video captured by the doorbell and the first item, and after the first item of the second graphic interface is selected, the second graphic interface is switched to a third graphic interface including the second item.

The at least one processor may transmit a control signal for unlocking the door lock to the door lock through the doorbell when a notification signal indicating selection of the second item is received from the user terminal.

The at least one processor may transmit an instant key value to the door lock as the control signal through the doorbell, and transmit a password corresponding to the instant key value to a client terminal corresponding to the visitor.

The at least one processor may respond to a third command among the commands to transmit a mode control signal for controlling the door lock to unlock the door lock based on a registered password to the door lock through the doorbell.

The at least one processor may receive an object registration signal in association with at least some of the feature data units, and generate the third command when the detected object matches one of the feature data units and the object registration signal is received in association with the matched feature data unit.

The third graphic interface may include the real-time video captured by the doorbell, the first item, and the second item.

Another aspect of the present disclosure relates to a door lock. The door lock includes: a locking device; a controller configured to control the locking device to be locked and unlocked; a user interface configured to receive a user input; a communicator configured to communicate with an external device through short range wireless communication; and a storage medium configured to store a password registered by a user, in which the controller unlocks the locking device by verifying, in a first verification mode, the password received through the user interface based on an instant key value received from the external device, and when a mode control signal is received from the external device, operates in a second verification mode, and in the second verification mode, verifies the password received through the user interface according to the registered password to unlock the locking device.

The controller may return from the second verification mode to the first verification mode when a predetermined time elapses from the time when the mode control signal is received.

The controller may return from the second verification mode to the first verification mode when a failure of the verification according to the registered password is repeated and reaches a threshold number of times.

According to an embodiment of the present disclosure, it is possible to provide a network server that provides improved security and user convenience for control of a door lock, and an operating method thereof.

DESCRIPTION OF EXEMPLARY EMBODIMENTS

Hereinafter, preferred embodiments according to the present disclosure will be described in detail with reference to the accompanying drawings. It should be noted that in the following description, only parts necessary for understanding an operation according to the present disclosure will be described, and descriptions of other parts will be omitted so as not to obscure the gist of the present disclosure. Also, the present disclosure is not limited to the embodiments described herein and may be embodied in other forms. However, embodiments described herein are provided to describe in detail enough to easily implement the technical idea of the present disclosure to a person having ordinary knowledge in the art to which the present disclosure belongs.

Throughout the present specification, when any one part is referred to as being "connected to" another part, it means that any one part and another part are "directly connected to" each other or are "indirectly connected to" each other with the other part interposed therebetween. The terminology used herein is for the purpose of describing particular embodiments and is not intended to limit the present disclosure. Throughout the present specification, unless explicitly described to the contrary, "comprising" any components will be understood to imply the inclusion of other elements rather than the exclusion of any other elements. "At least any one of X, Y, and Z" and "at least any one selected from the group consisting of X, Y, and Z" means one X, one Y, one Z, or two of X, Y, and Z, or any combinations (e.g., XYZ, XYY, YZ, and ZZ) of two or more. Herein, "and/or" includes any combination of one or more of the components. Herein, "and/or" includes any combination of one or more of the components.

Figure 1:
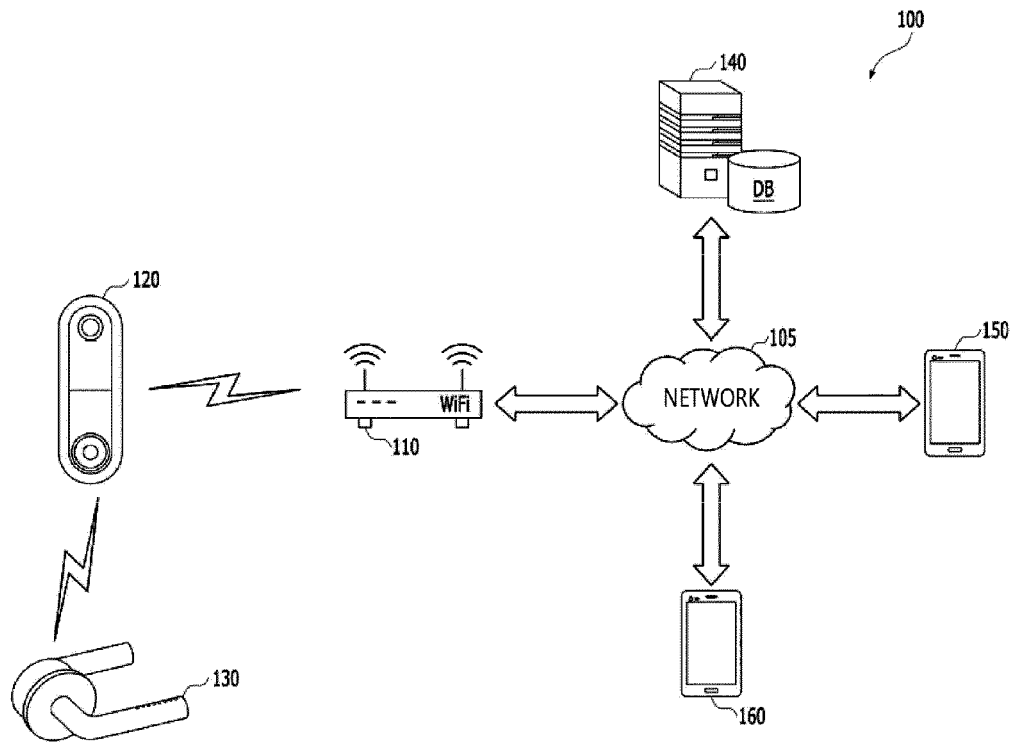
FIG. 1 is a block diagram illustrating a network system according to an embodiment of the present disclosure.

FIG. 1 is a block diagram illustrating a network system according to an embodiment of the present disclosure.

Referring to FIG. 1, a network system 100 may include a network 105, a router 110, a doorbell 120, a door lock 130, an access management server 140, and a user terminal 150.

The network system 100 may include a plurality of devices, servers, and/or software configurations that operate to perform various methods according to embodiments of the present disclosure described herein. The devices and/or servers illustrated in FIG. 1 may be configured in different ways, and operations and services provided by the devices and/or servers may be combined or separated for the embodiments described herein, and may be performed by more or fewer devices and/or servers. One or more devices and/or servers may be run and/or maintained by the same or different entities.

The network 105 connects the network 105, the router 110, the access management server 140, and the user terminal 150. The network 50 may include at least one of a public network, at least one private network, a wired network, a wireless network, other suitable types of networks, and combinations thereof. Each of the components in the network system 100 may include at least one of a wired communication function and a wireless communication function, and thus, may communicate with each other through the network 50.

The router 110 is connected to the network 105. The router 110 interfaces the doorbell 120 and the network 105. The router 110 may transmit the loaded data while loading the received data packets into its internal memory. The router 110 may transmit data received from the doorbell 120 to a corresponding target device and/or a server connected to the network 105. Also, the router 110 may transmit data received from the access management server 140 and/or the user terminal 150 to the doorbell 120.

The doorbell 120 may include a camera and a microphone to capture video and audio. The doorbell 120 may communicate with the router 110 by wire and/or wirelessly. Therefore, the doorbell 120 is connected to the network 105 through the router 110, and may transmit the captured video and audio to the access management server 140 and/or the user terminal 150 connected to the network 105.

The doorbell 120 may detect an object (for example, a face) from the captured video, and may generate a feature data unit indicating characteristics of the detected object. The doorbell 120 may provide the generated feature data unit to the access management server 140.

The doorbell 120 is installed adjacent to the door lock 130, and may communicate with the door lock 130 by wire and/or wirelessly. In embodiments, the doorbell 120 may communicate with the door lock 130 through short range wireless communication. The doorbell 120 interfaces between the door lock 130 and the router 110. The doorbell 120 may transmit signals received from the access management server 140 and/or the user terminal 150 to the door lock 130 through the router 110, and also transmit the signals received from the door lock 130 to the access management server 140 and/or the user terminal 150 through the router 110. The door lock 130 may, for example, be installed on a door to block and allow an entry of the visitor.

The access management server 140 provided as a network server may communicate with the router 110 and the user terminal 150 through the network 105. The access management server 140 may communicate with the doorbell 120 and the door lock 130 through the router 110. The access management server 140 may control the user terminal 150 to display one of a plurality of graphic interfaces based on a feature data unit acquired from the video captured by the doorbell 120. In addition, the access management server 140 may relay the video and audio captured by the doorbell 120 to the user terminal 150 in real time, and furthermore, relay a real-time call between the doorbell 120 and the user terminal 150 In this case, the real-time call includes at least one of a video call and an audio call.

Each of the graphic interfaces displayed on the user terminal 150 may include areas for displaying a plurality of pieces of information. For example, some of the graphic interfaces may include an area for displaying a real-time video captured by the doorbell 120, an area for selecting a call with a visitor, and an area for selecting unlocking of the door lock 130. The graphic interfaces will be described in detail with reference to FIGS. 9 to 13 and 22.

When a request unlocking of the door lock 130 is received from the user terminal 150, the access management server 140 may transmit a door lock control signal to the door lock 130 through the doorbell 120 to control the door lock 130 to be locked and unlocked. In embodiments, the access management server 140 may transmit the instant key value to the door lock 130 as the door lock control signal, and transmit the password corresponding to the instant key value to the client terminal 160 owned by a visitor. The door lock 130 may perform locking and unlocking by verifying a password input by the visitor based on the instant key value.

The user terminal 150 may communicate with the access management server 140 via the network 105. The user terminal 150 may display one of a plurality of graphic interfaces in response to the control of the access management server 140, display the real-time video captured by the doorbell 120, and include an application to support the real-time call with the door bell 120. In embodiments, the user terminal 150 may be a computing device, such as a computer, an ultra mobile PC (UMPC), a workstation, a net-book, personal digital assistants (PDA), a portable computer, a web tablet, a wireless phone, a mobile phone, a smart phone, an e-book, and a portable multimedia player (PMP), which may transmit and receive information in a wired and/or wireless environment.

Figure 2:
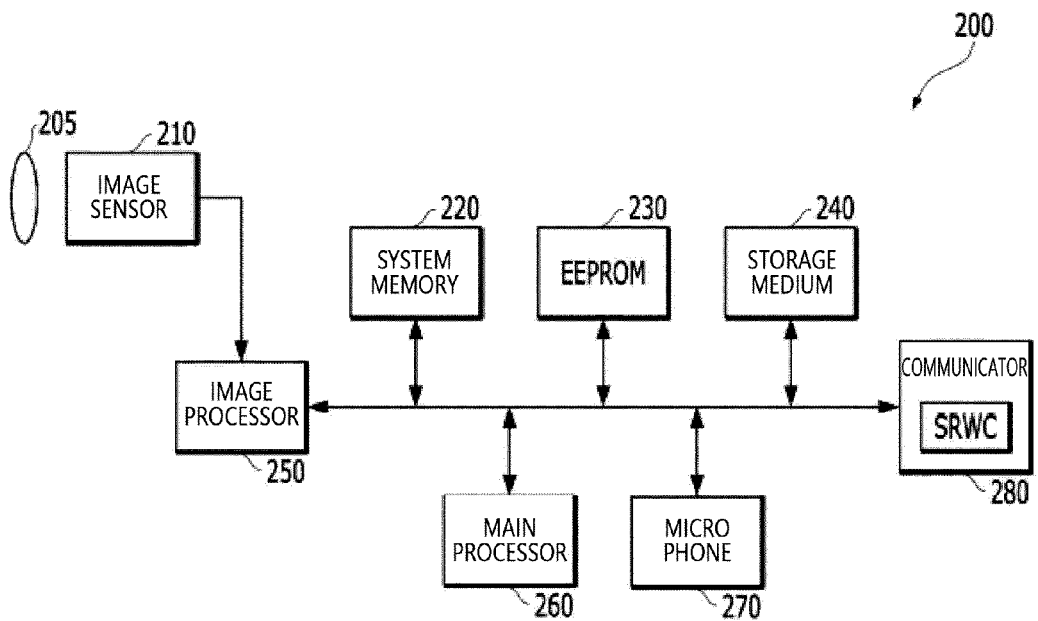
FIG. 2 is a block diagram illustrating an embodiment of a doorbell of FIG. 1.

FIG. 2 is a block diagram illustrating an embodiment of the doorbell of FIG. 1.

Referring to FIG. 2, the doorbell 200 may include an optical system 205, an image sensor 210, a system memory 220, an electrically erasable and programmable read only memory (EEPROM) 230, a storage medium 240, an image processor 250, a main processor 260, a microphone 270, and a communicator 280.

The optical system 205 optically processes light from a subject.

The image sensor 210 is configured to convert an optical signal received through a component such as a lens of the optical system 205 into an electrical signal, and digitize the converted electrical signal to generate video. For example, the image sensor 210 may include an analog-to-digital converter that is configured to convert an analog video signal into digital video data.

The system memory 220 is connected to the image processor 250 and the main processor 260. The system memory 220 may be used as a working memory of the image processor 250 and the main processor 260. The system memory 220 may temporarily store data processed by the image processor 250 and the main processor 260. The system memory 220 may be used as a buffer memory. In embodiments, the system memory 220 may include a random access memory (RAM).

The electrically erasable and programmable read only memory (EEPROM) 230 may store program codes and/or instructions necessary for the operation of the image processor 250 and the main processor 260.

The storage medium 240 may store setting data necessary for the operations of the image processor 250 and the main processor 260. In addition, the storage medium 240 may further store program codes and/or instructions to be executed by the image processor 250 and the main processor 260. The program codes and/or instructions may be loaded into the system memory 220 from the EEPROM 230 and/or the storage medium 240 and executed by the image processor 250 and the main processor 260. At least some of the operations of the main processor 260 to be described below may be performed by executing these program codes and/or instructions by the main processor 260. In embodiments, the storage medium 240 may include a nonvolatile storage medium such as a flash memory.

The image processor 250 is configured to process the video received from the image sensor 210. For example, the image processor 250 may store video from the image sensor 210 in the system memory 220, convert video data in red (R), green (G), and blue (B) formats into video data in luminance (Y) and chrominance (Cb, Cr) formats, and perform appropriate processing on the video received from the image sensor 210, such as converting a resolution of the video data. The processed video may be stored in the system memory 220.

The main processor 260 controls the overall operation of the doorbell 200. The main processor 260 responds to, for example, an alarm signal that may be generated internally or externally to control the optical system 205, the image sensor 210, and the image processor 250 to perform operations related to capturing the video.

The main processor 260 may detect an object included in the video processed by the image processor 250, that is, the captured video, and generate a feature data unit representing features of the detected object. For example, the main processor 260 may detect an area including an object in the captured video, acquire and/or store an image of the detected object, and provide feature information of the object, for example, feature points as the feature data unit. Various algorithms known to those skilled in the art may be used to extract the feature data unit. The main processor 260 may transmit the generated feature data unit to the access management server 140 (refer to FIG. 1).

In embodiments, the main processor 260 may further transmit a thumbnail image and/or video of the detected object to the access management server 140. In embodiments, when the object is detected, the main processor 260 may transmit an alarm signal to the access management server 140 so that the access management server 140 may notify the user terminal 150 (see FIG. 1) of the occurrence of an event.

Also, the main processor 260 may transmit the captured video to the access management server 140 and/or the user terminal 150 through the communicator 280 in real time. The main processor 260 may receive audio data received through the microphone 270, appropriately process the received audio data, and transmit the processed audio data to the access management server 140 and/or the user terminal 150 through the communicator 280 in real time. In this case, video and audio may configure multimedia data. When the captured video and audio are transmitted to the access management server 140, the access management server 140 may relay the received video and voice to the user terminal 150.

The communicator 280 is configured to provide communication between the doorbell 200 and an external device in response to the control of the main processor 260. The communicator 280 may communicate with the router 110 of FIG. 1, and thus, may communicate with components connected to the network 105 of FIG. 1. In embodiments, the communicator 280 may communicate with the router 110 through wireless communication such as Wi-Fi communication.

The communicator 280 may include a short range wireless communicator (SRWC) that may communicate with the door lock 130 of FIG. 1 through short range wireless communication such as Bluetooth communication, near field communication (NFC), magnetic secure transmission (MST) communication, Zigbee communication, and infrared (IrDA) communication. The short range wireless communicator (SRWC) will communicate data with the door lock 130 in response to the control of the main processor 260.

Figure 3:
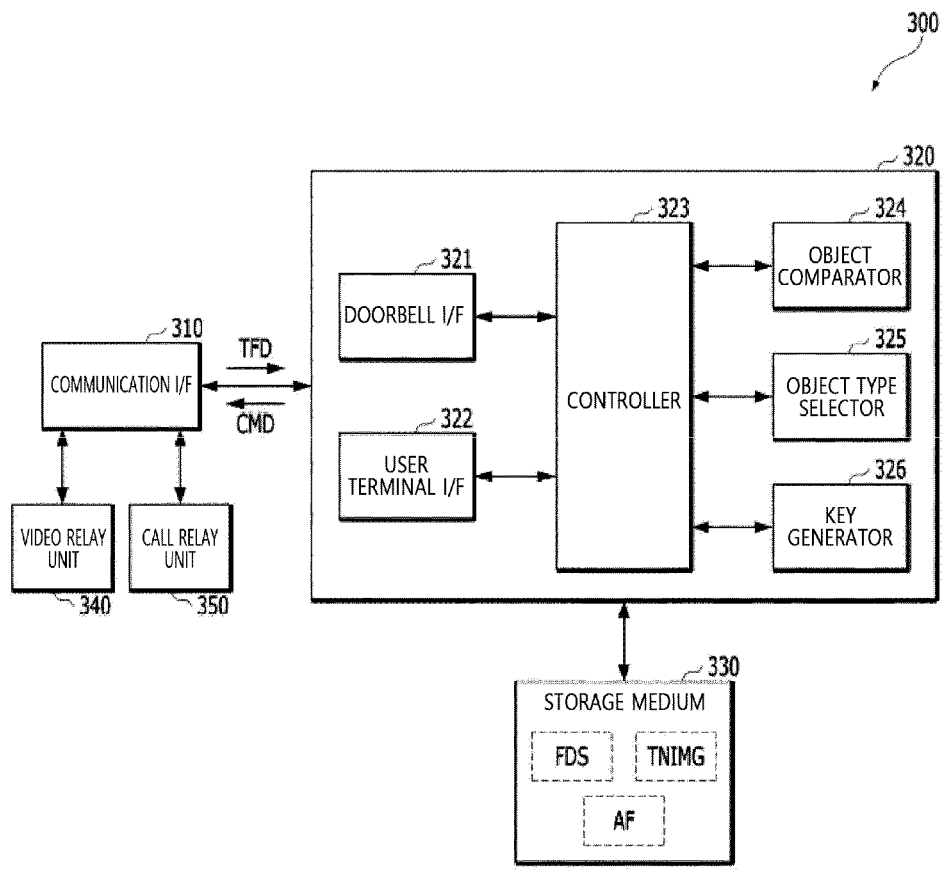
FIG. 3 is a block diagram illustrating an embodiment of an access management server of FIG. 1.
Figure 4:
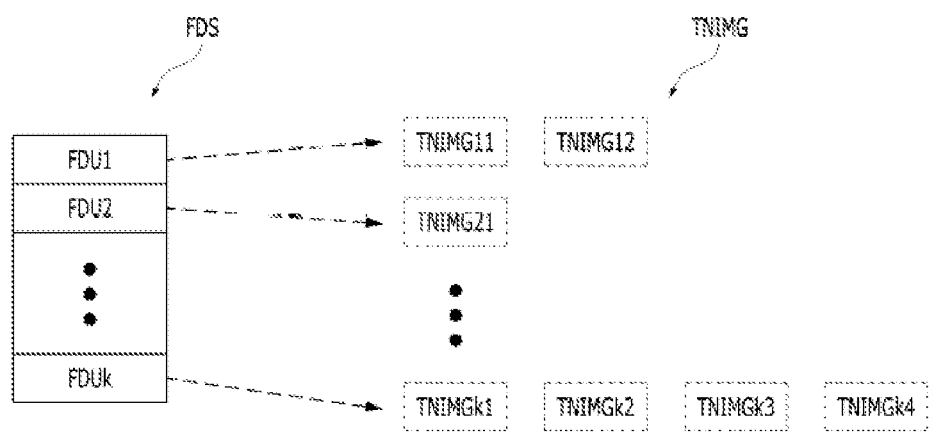
FIG. 4 is a diagram conceptually illustrating an embodiment of a feature data set and thumbnail images of FIG. 3.

FIG. 3 is a block diagram illustrating an embodiment of the access management server of FIG. 1. FIG. 4 is a diagram conceptually illustrating an embodiment of the feature data set and the thumbnail images of FIG. 3.

Referring to FIGS. 1 and 3, the access management server 300 includes a communication interface (I/F) 310, an access management device 320, a storage medium 330, a video relay unit 340, and a call relay unit 350.

The communication interface 310 provides an interface between the components of the access management server 300 and the network 105. The communication interface 310 may transmit data and/or signals received from the outside to the access control device 320, the video relay unit 340, and the call relay unit 350, and transmit the data and/or signals of the access management device 320, the video relay unit 340, and the call relay unit 350 to the outside.

When an object is detected in the captured video, the doorbell 120 may transmit data representing featuring of the detected object to the access management server 300 as a target feature data unit TFD. The communication interface 310 transmits the target feature data unit TFD from the doorbell 120 to the access control device 320. The access management device 320 may output a command CMD for controlling the user terminal 150 to display one of a plurality of graphic interfaces based on the target feature data unit TFD. The communication interface 310 may transmit the command CMD generated by the access management device 320 to the user terminal 150.

The access management device 320 may be connected to the communication interface 310 and the storage medium 330. The access control device 320 may include a doorbell interface 321, a user terminal interface 322, a controller 323, an object comparator 324, an object type selector 325, and a key generator 326.

The doorbell interface 321 interfaces between the controller 323 and the doorbell 120. For example, the doorbell interface 321 may transmit, to the controller 323, the target feature data unit TFD that is generated by the doorbell 120 and received through the communication interface 310. The user terminal interface 322 interfaces between the controller 323 and the user terminal 150. For example, the user terminal interface 322 may transmit the command CMD generated by the controller 323 to the user terminal 150 through the communication interface 310.

The controller 323 is configured to control the overall operations of the access control device 320. The controller 323 may store the target feature data unit TFD in the storage medium 330 to be included in the feature data set FDS. As such, when the feature data set FDS is updated whenever the target feature data unit TFD is received, the feature data set FDS may include feature data units corresponding to visitors who have visited the vicinity of the door lock 130.

Meanwhile, the doorbell 120 may provide a thumbnail image including a corresponding object when providing the target feature data unit TFD. The controller 323 may store the thumbnail image in the storage medium 330 in association with the target feature data unit TFD. Accordingly, the storage medium 330 stores one or more thumbnail images TNIMG corresponding to each feature data unit of the feature data set FDS.

Referring to FIG. 4, as described above, the feature data set FDS may include a plurality of feature data units such as first to k-th feature data units FDU1 to FDUk. Whenever the target feature data unit TFD is received, these may be provided by including the target feature data unit TFD in the feature data set FDS. The fact that the currently received target feature data unit TFD matches any one of the first to k-th feature data units FDU1 to FDUk may mean that the corresponding visitor has a visit history.

Each of the first to k-th feature data units FDU1 to FDUk may be mapped to one or more thumbnail images TNIMG. In FIG. 4, the first feature data unit FDU1 may be mapped to thumbnail images TNIMG11 and TNIMG12, the second feature data unit FDU2 may be mapped to a thumbnail image TNIMG21, and a k-th feature data unit FDUk may be mapped to the thumbnail images TNIMGk1, TNIMGk2, TNIMGk3, and TNIMGk4.

Referring back to FIGS. 1 and 3, the controller 323 provides the target feature data unit TFD to the object comparator 324. The object comparator 324 is configured to determine whether the target feature data unit TFD matches any one of the feature data units of the feature data set FDS in response to the control of the controller 323, and transmit the result signal to the controller 323.

The object type selector 325 operates in response to the control of the controller 323. The object type selector 325 is configured to determine the target feature data unit TFD or a group corresponding to the visitor from among the plurality of groups based on the result signal provided by the object comparator 324. For example, any one of the first to third groups may be selected, in which the first group may represent reliable visitors, the second group may represent non-reliable visitors, and the third group may represent visitors having higher reliability than the first group.

The key generator 326 is configured to generate the instant key value in response to the control of the controller 323. It will be appreciated that the instant key value may be generated according to various schemes. In embodiments, the instant key value generated by the key generator 326 may be generated based on data associated with the user terminal 150. Also, the key generator 326 may generate a password corresponding to the generated instant key value. In embodiments, the generated password may be the same as the instant key value. As another example, the generated password and the instant key value may have a relationship that may be converted in both directions or in one direction through various encryption/decryption algorithms. The key generator 326 may include a random number generator.

The controller 323 may generate the command CMD corresponding to a group selected by the object type selector 325 among the plurality of types of commands, and transmit the generated command CMD to the user terminal through the user terminal interface 322. Also, the controller 323 may further transmit the thumbnail images TNIMG corresponding to the target feature data unit TFD to the user terminal 150 through the user terminal interface 322. The user terminal 150 may display a different graphic interface in response to different types of commands, in which the displayed graphic interface may include the thumbnail images TNIMG. This will be described in detail with reference to FIGS. 9 to 13 and 22.

When a request unlocking of the door lock 130 is received from the user terminal 150 through the user terminal interface 322, the controller 323 may control the key generator 326 to generate the instant key value. The controller 323 may transmit the instant key value provided from the key generator 326 to the doorbell 120 through the doorbell interface 321. The instant key will be transmitted to the door lock 130 through the doorbell 120. In addition, the controller 323 may transmit the password provided from the key generator 326 to the client terminal 160 of the visitor through the doorbell interface 322.

The storage medium 330 may be provided as at least a part of the database (DB) of FIG. 1. The storage medium 330 may store the feature data set FDS and thumbnail images TNIMG. Furthermore, the storage medium 330 may further store an application file. The controller 323 may provide an application file to the user terminal 150 in response to a request from the user terminal 150, and the application file may be installed in the user terminal 150 to perform the operations of the user terminal 150 described herein. In other embodiments, the application file may be stored in a third party server and provided to the user terminal 150.

The video relay unit 340 may relay the video captured by the doorbell 120 to the user terminal 150 in real time. The video provided through the video relay unit 340 may be included in the graphic interface of the user terminal 150.

The call relay unit 350 may relay audio transmitted from the doorbell 120 to the user terminal 150 in real time, and relay audio transmitted from the user terminal 150 to the doorbell 120 in real time. Also, in embodiments in which a video call function is supported, the video relay unit 340 may relay the video captured by the user terminal 150 to the user terminal 150 in real time.

In FIG. 2, the storage medium 330 is illustrated as a component included in the access management server 300. However, embodiments of the present disclosure are not limited thereto. At least a part of the storage medium 330 may be provided to the outside of the access management server 300, and the components of the access management server 300 may read data from the storage medium 330 through the communication interface 310, and write the data to the storage medium 330.

In embodiments, at least one function of the object comparator 324 and the object type selector 325 may be included in the doorbell 120. In this case, the doorbell 120 may store the feature data set FDS and thumbnail images TNIMG in the storage medium (see 240 in FIG. 2) therein, and at least one of the object comparator 324 and the object type selector 325 may be omitted from the access management device 320.

Figure 5:
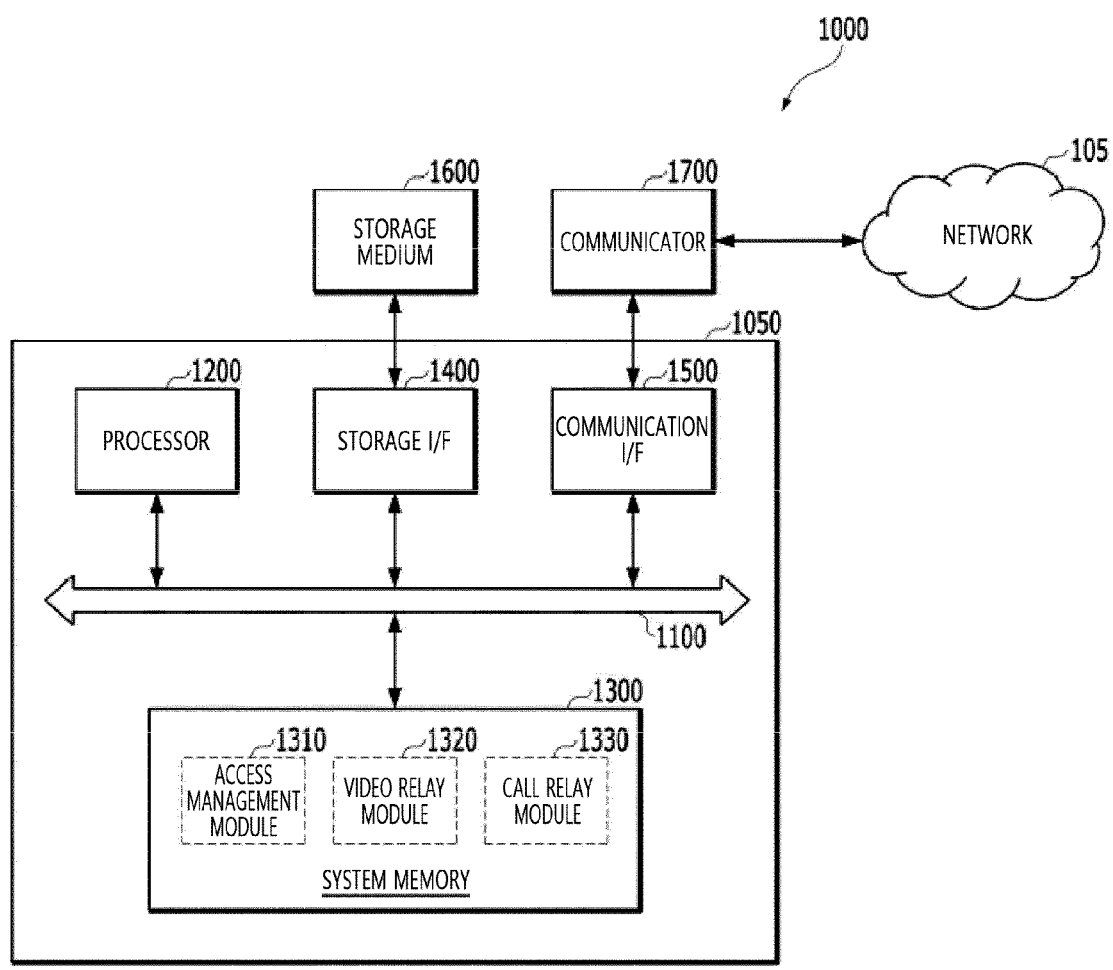
FIG. 5 is a block diagram illustrating an embodiment of a computer device for implementing the access management server of FIG. 3.

FIG. 5 is a block diagram illustrating an embodiment of a computer device for implementing the access management server of FIG. 3.

Referring to FIG. 5, a computer device 1000 includes a bus 1100, at least one processor 1200, a system memory 1300, a storage interface 1400, a communication interface 1500, a storage medium 1600, and a communicator 1700.

The bus 1100 is connected to various components of the computer device 1000 to transmit data, signals, and information. The processor 1200 may be either a general-purpose or dedicated processor, and may control the overall operations of the computer device 1000.

The processor 1200 is configured to load program codes and instructions, which provide various functions when executed, into the system memory 1300 and process the loaded program codes and instructions. The system memory 1300 may be provided as a working memory of the processor 1200. In an embodiment, the system memory 1300 may include at least one of a random access memory (RAM), a read only memory (ROM), and other types of computer-readable media.

The processor 1200 may load, into the system memory 1300, an access management module 1310, a video relay module 1320, and a call relay module 1330 that, when executed by the processor 1200, provides the functions of the access management device 320, the video relay unit 340, and the call relay unit 350 of FIG. 3, respectively. Such program codes and/or instructions may be executed by the processor 1200 to perform the operations of the access management servers 140 and 300 described with reference to FIGS. 1 and 3. In addition, the system memory 1300 may function as a buffer memory for the access management module 1310, the video relay module 1320, and the call relay module 1330. In FIG. 5, the system memory 1300 is illustrated as being separate from the processor 1200, but at least a part of the system memory 1300 may be included in the processor 1200.

Program codes and/or instructions may be loaded into the system memory 1300 from the storage medium 1600, which is a separate computer-readable recording medium. Alternatively, program codes and/or instructions may be loaded into the system memory 1300 through the communicator 1700 from the outside of the computer device 1000.

The storage interface 1400 is connected to the storage medium 1600. The storage interface 1400 may interface between the storage medium 1600 and components such as the processor 1200 and the system memory 1300 connected to the bus 1100. The communication interface 1500 is connected to communicator 1700. The communication interface 1500 may interface between the components connected to the bus 1100 and the communicator 1700. The communication interface 1500 may be provided as the communication interface 310 of FIG. 3.

In embodiments, the bus 1100, the processor 1200, and the system memory 1300 may be integrated into one board 1050. In embodiments, the bus 1100, the processor 1200, and the system memory 1300 may be mounted on one semiconductor chip. In embodiments, one board 1050 may further include the storage interface 1400 and the communication interface 1500.

The storage medium 1600 may include various types of nonvolatile storage media, such as a flash memory, a hard disk, and the like, which retain stored data even when power is cut off. The communication interface 1600 may be provided as the communication interface 330 of FIG. 3. In this case, the storage medium 1600 may store the feature data set FDS, the thumbnail images TNIMG, and the application file AF of FIG. 3.

The communicator 1700 (or transceiver) may transmit and receive signals between the computer device 1000 and other devices and/or servers in the network system 100 (see FIG. 1) through the network 105 (see FIG. 1).

Figure 6:
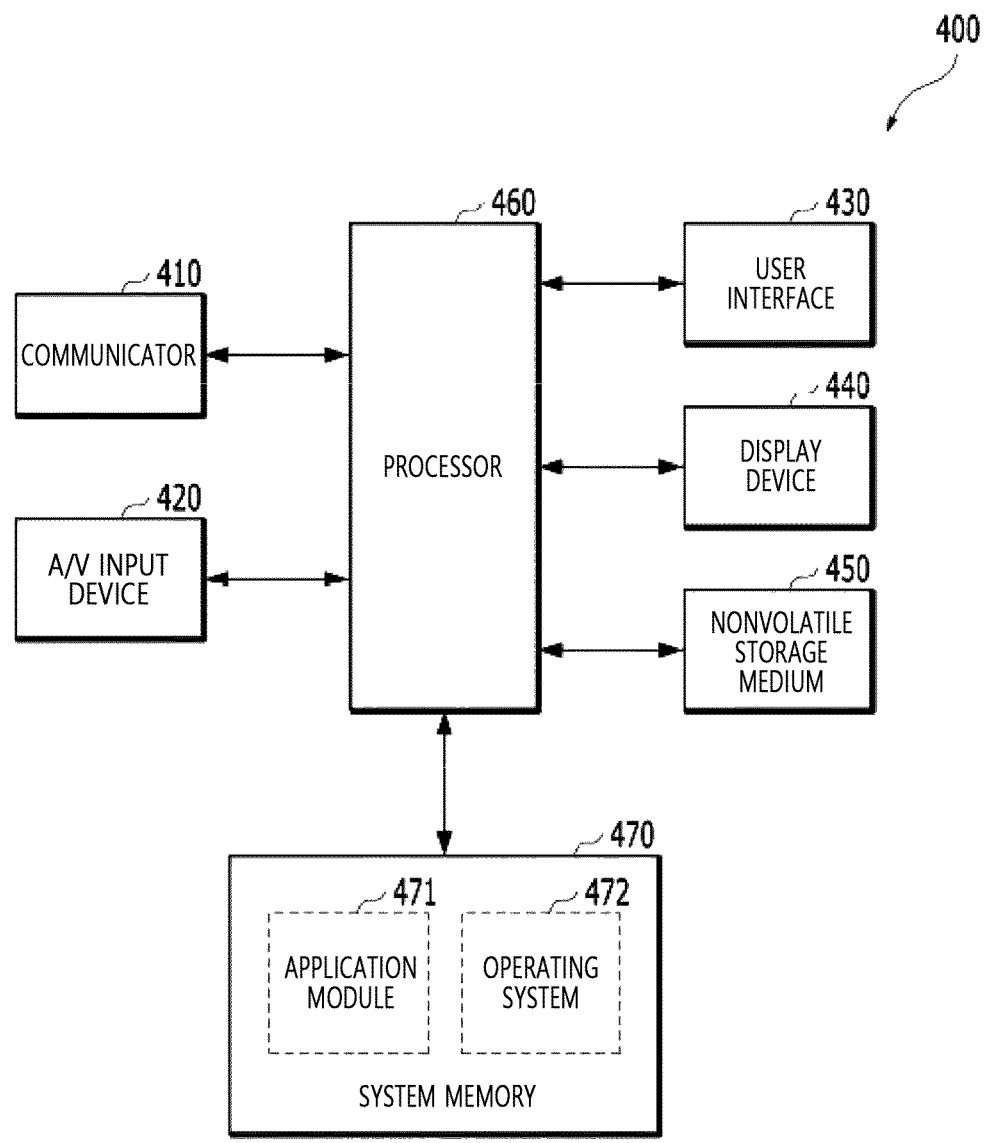
FIG. 6 is a block diagram illustrating an embodiment of a user terminal of FIG. 1.

FIG. 6 is a block diagram illustrating an embodiment of the user terminal of FIG. 1.

Referring to FIG. 6, the user terminal 400 includes a communicator 410, an audio/video (A/V) input device 420, a user interface 430, a display device 440, a nonvolatile storage medium 450, a processor 460, and a system memory 470.

The communicator 410 is configured to transmit a radio signal with at least one of a base station, an external server, and an external terminal on a mobile communication network. In this case, the wireless signal may include various types of data according to transmission and reception of an audio call signal, a video call signal, or a text/multimedia message. Also, the communicator 410 is configured to connect to the wireless Internet. Furthermore, the communicator 410 is configured to perform short range wireless communication, in which short range wireless communication may include communication using at least one communication protocol of Bluetooth, Wi-Fi communication, LTE D2D communication, NFC, magnetic secure transmission communication, Zigbee communication, infrared communication, UWB communication, Ant+ communication, and/or the like.

The A/V input device 420 is for inputting an audio signal and a video signal, and may include a camera and a microphone. The A/V input device 420 processes video obtained by an image sensor of a camera and audio obtained through a microphone. The processed data may be stored in the system memory 470 or transmitted to the outside through the communicator 410.

The user interface 430 receives a user input for controlling operations of the user terminal 400 or the processor 460. The user interface 430 may include a key pad, a dome switch, a touch pad (static pressure/capacitance), a jog wheel, a jog switch, a finger mouse, and the like.

The display device 440 operates in response to the control of the processor 460. The display device 440 displays information processed by the user terminal 400 or the processor 460. For example, the display device 440 may display video and/or images under the control of the processor 460. When the display device 440 is integrally formed with the touch pad to constitute a touch screen, the display device 440 may visualize the user interface 430. Examples of screens displayed on the display device 440 are illustrated in FIGS. 9 to 13 and 22.

The display device 440 may include at least one of various types of display devices such as a liquid crystal display, an organic light-emitting diode display, and a flexible display.

The nonvolatile storage medium 450 may be at least one of a flash memory type, a hard disk type, and a multimedia card. The nonvolatile storage medium 450 is configured to write and read data in response to the control of the processor 460.

The processor 460 may include either a general purpose or a dedicated processor, and controls the operations of the communicator 410, the A/V input device 420, the user interface 430, the display device 440, the nonvolatile storage medium 450, and the system memory 470.

The processor 460 may load program codes and/or instructions from the nonvolatile storage medium 450 into the system memory 470 and execute the loaded program codes. The system memory 470 may be provided as the working memory of the processor 460. When executed by the processor 460, the processor 460 may load an application module 471, which performs the operation of the user terminal 400 described herein, into the system memory 470, and execute the loaded application module 471. For example, when executed by the processor 460, the application module 471 may display instructions for displaying one of a plurality of graphic interfaces in response to the control of the access management server 300 (see FIG. 3), instructions for detecting a user input received through a user interface visualized by the displayed graphic interface, and instructions for performing an operation corresponding to the detected user input. The processor 460 may load the operating system 472 into the system memory 470 and execute the loaded operating system 472. The operating system 472 may provide an interface that enables the application module 471 to use components of the user terminal 400.

In FIG. 6, the system memory 470 is illustrated as a component separate from the processor 460, but this is exemplary and at least a part of the system memory 470 may be integrated into the processor 460. The system memory 470 may include at least one of RAM, a read only memory (ROM), and other types of computer-readable storage media.

Figure 7:
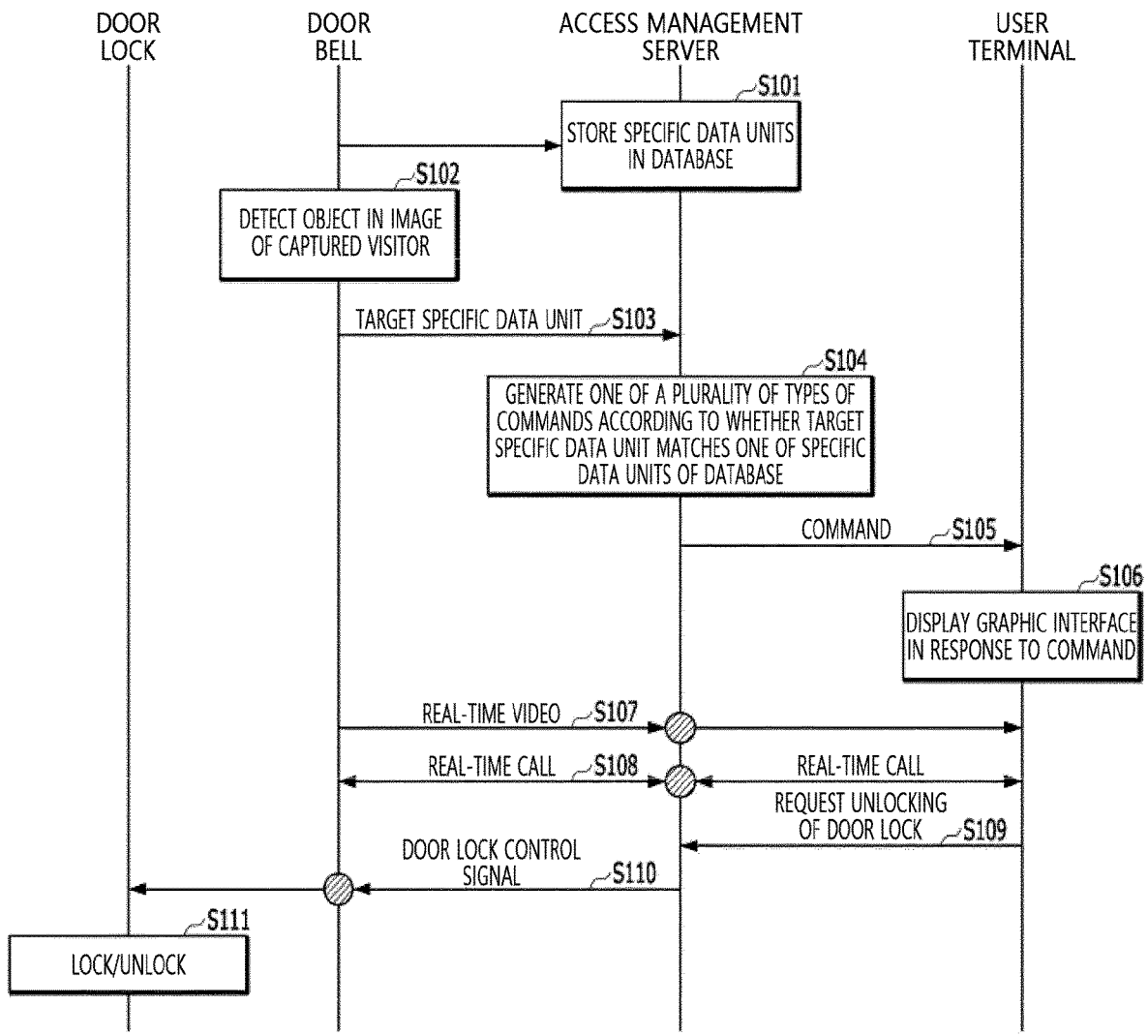
FIG. 7 is a flowchart illustrating a method for operating a network system according to an embodiment of the present disclosure.

FIG. 7 is a flowchart illustrating a method for operating a network system according to an embodiment of the present disclosure. In FIG. 7, an operation of relaying data and/or signals between both components is shown in patterned circles for convenience of recognition.

Referring to FIGS. 1 and 7, in step S101, the access management server 140 stores the feature data units in the database (DB). Whenever the target feature data unit is received as in step S103, this may be performed by updating the target feature data unit in the database (DB).

In step S102, the doorbell 120 detects an object in the captured visitor's video. In step S103, the doorbell 120 transmits the target feature data unit indicating the features of the object to the access management server 140. In embodiments, the doorbell 120 or the access management server 140 may generate an alarm event when the object is detected and the target feature data unit is generated, and transmit the generated alarm event to the user terminal 150 to trigger the application.

In step S104, the access management server 140 generates one of a plurality of types of commands according to whether the target feature data unit matches one of the feature data units stored in the database (DB). In step S105, the generated command is transmitted from the access management server 140 to the user terminal 150.

In step S106, the user terminal 150 displays a graphic interface in response to the received command.

The graphic interface may include the real-time video captured by the doorbell 120. In step S107, the doorbell 120 may provide the real-time video currently being captured, and the access management server 140 may relay the received real-time video to the user terminal 150. In other embodiments, the doorbell 120 and the user terminal 150 may communicate the real-time video without the relay of the access management server 140 through peer-to-peer communication.

The graphic interface may include a user interface for selecting a call between the doorbell 120 and the user terminal 150. In step S108, when the call is selected, the doorbell 120 and the user terminal 150 may perform a real-time call. The audio acquired from the doorbell 120 will be provided to the user terminal 150 in real time, and the audio acquired from the user terminal 150 will be provided to the doorbell 120 in real time. The access management server 140 may relay data communicating between the doorbell 120 and the user terminal 150. In other embodiments, the doorbell 120 and the user terminal 150 may perform the real-time video without the relay of the access management server 140 through the peer-to-peer communication.

The graphic interface may include a user interface for unlocking the door lock 130. In step S109, the user terminal 150 may transmit the request unlocking of the door lock to the access management server 140. The access management server 140 may provide the door lock control signal to the doorbell 120 in step S110, and the doorbell 120 may relay the door lock control signal to the door lock 130.

In step S111, the door lock 130 may perform locking or unlocking based on the door lock control signal.

Figure 8:
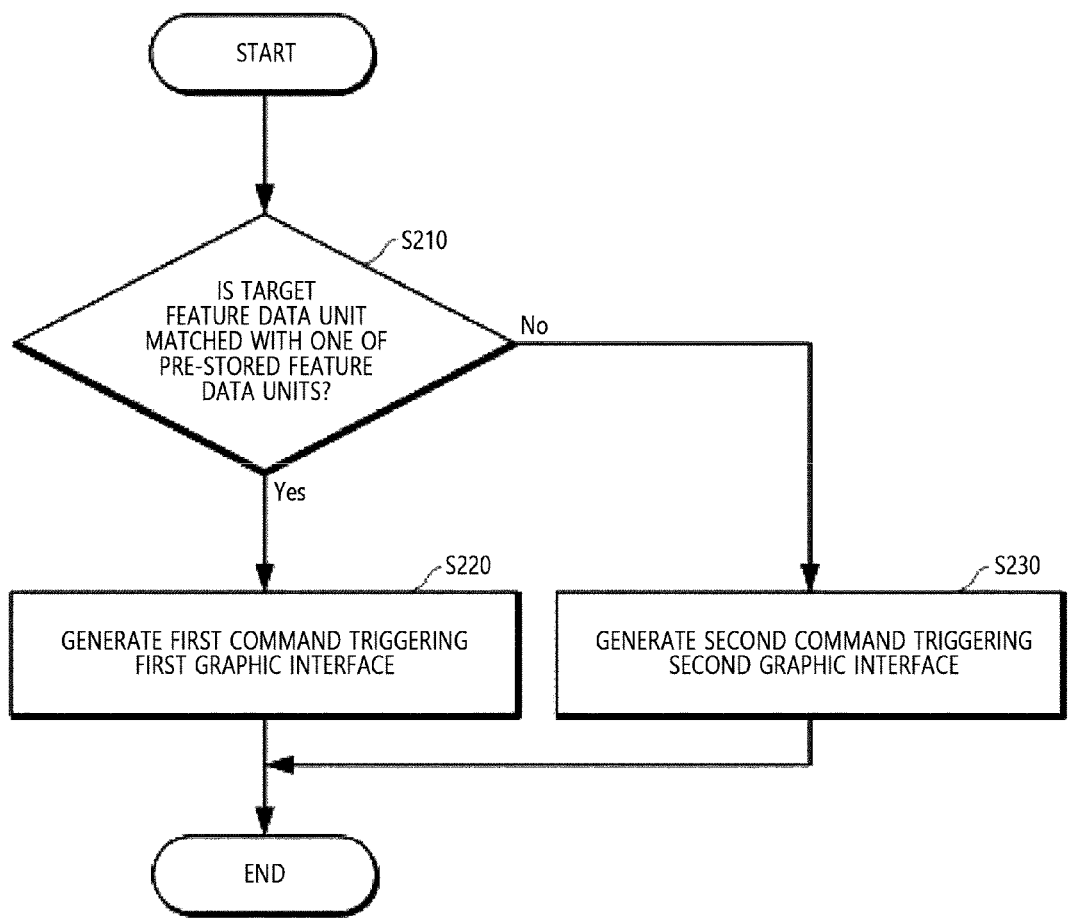
FIG. 8 is a flowchart illustrating an embodiment of step S104 of FIG. 7.

FIG. 8 is a flowchart illustrating an embodiment of step S104 of FIG. 7.

Referring to FIGS. 1 and 8, in step S210, it is determined whether the target feature data unit matches one of the feature data units stored in the database (DB). If so, step S220 is performed. If not, step S220 is performed.

In step S220, a first command for triggering a first graphic interface is generated. In step S230, a second command for triggering a second graphic interface is generated. The user terminal 150 may display the first and second graphic interfaces illustrated in FIGS. 9 and 10 in response to the first and second commands, respectively.

Figure 9:
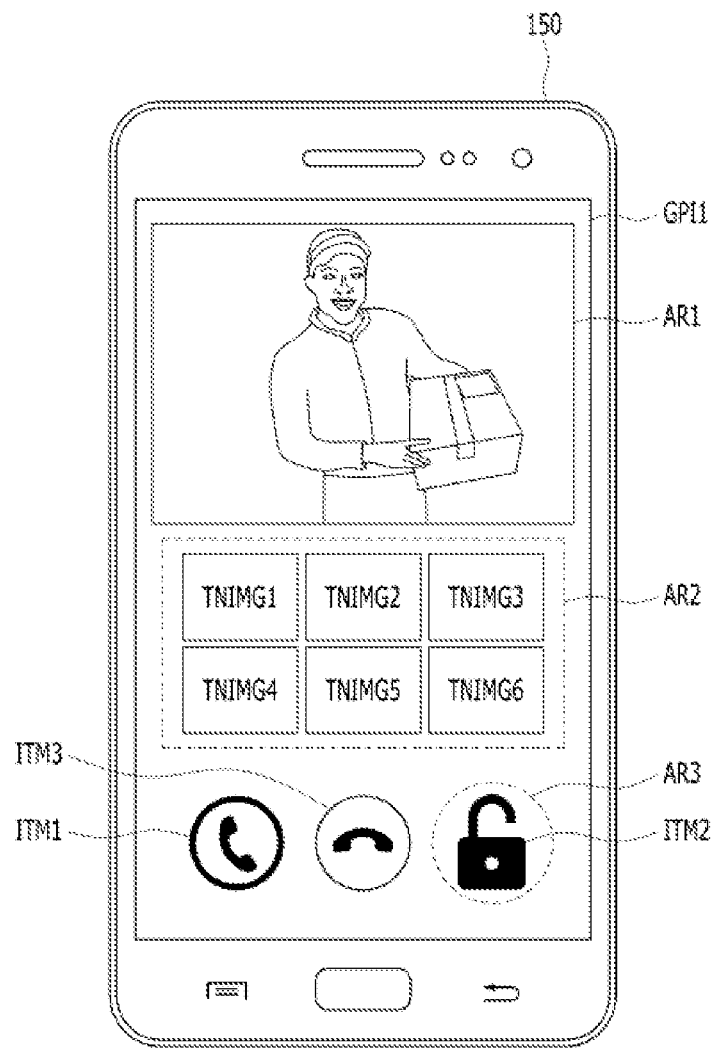
FIG. 9 is a diagram illustrating an embodiment of a graphic interface displayed on the user terminal when a first command is received from the access management server.

FIG. 9 is a diagram illustrating an embodiment of the graphic interface displayed on the user terminal when the first command is received from the access management server.

Referring to FIGS. 1 and 9, the user terminal 150 may display a first graphic interface GPI1 in response to the first command. The first graphic interface GPI1 may includes a first area AR1 that displays the real-time video being captured by the doorbell 120, and a second area AR2 that includes thumbnail images TNIMG1 to TNIMG6 corresponding to the detected object. The thumbnail images TNIMG1 to TNIMG6 may be managed by the access management server 140 as described with reference to FIGS. 3 and 4, and when the first graphic interface GPI1 is displayed, may be provided from the access management server 140 and displayed in the second area AR2.

The first graphic interface GPI1 may further include a first item ITM1 for selecting a call between the user terminal 150 and the doorbell 120, a second item ITM2 for selecting unlocking the door lock 130, and a third item (ITM3) for rejecting and/or terminating the call.

As described above, the first graphic interface GPI1 is displayed when the object detected by the doorbell 120 matches one of the feature data units stored in the access management server 140. That is, the corresponding visitor has a visit history. A visitor having a visit history may be expected to have relatively higher reliability than a visitor without a visit history. According to an embodiment of the present disclosure, the user terminal 150 is controlled to display the first graphic interface ITM2 including the second item ITM2 for selecting the unlocking of the door lock 130 when the visitor captured by the doorbell 120 has the visit history. Accordingly, the access management server 140 and/or the network system 100 providing the improved user convenience may be provided.

Figure 10:
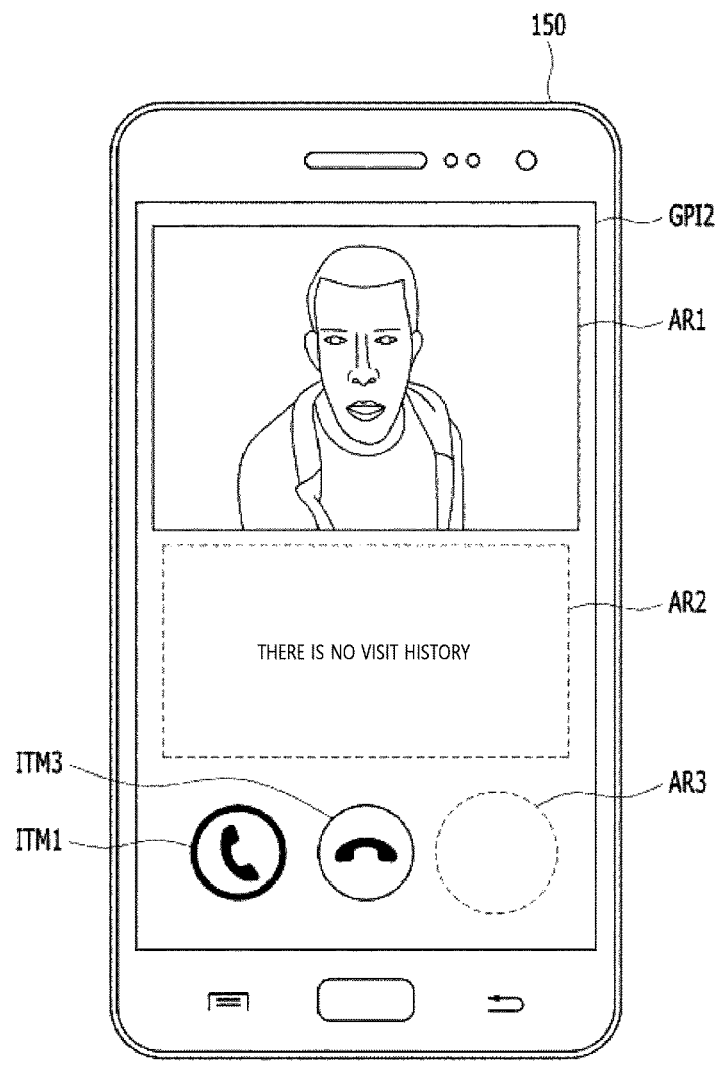
FIG. 10 is a diagram illustrating an embodiment of the graphic interface displayed on the user terminal when a second command is received from the access management server.

FIG. 10 is a diagram illustrating an embodiment of the graphic interface displayed on the user terminal when the second command is received from the access management server.

Referring to FIGS. 1 and 10, the user terminal 150 may display a second graphic interface GPI2 in response to the second command. Like the first graphic interface GPI1 of FIG. 9, the second graphic interface GPI2 may include the first area AR1 and the second area AR2. The real-time video being captured by the doorbell 120 is displayed in the first area AR1. Since the second command is received when none of the feature data units stored in the database DB does not match the object detected in the video being captured by the doorbell 120 (see S230 of FIG. 8), the visit history of the corresponding visitor does not exist. Accordingly, the thumbnail image is not provided, and for example, a message such as "There is no visit history" may be displayed in the second area AR2 as illustrated in FIG. 10.

The second graphic interface GPI2 may further include the first item ITM1 for selecting a call between the user terminal 150 and the doorbell 120, and the third item ITM3 for rejecting and/or terminating the call. The second graphic interface GPI2 does not include the second item ITM2 (see FIG. 9) for selecting the unlocking of the door lock 130. In embodiments, the first graphic interface GPI1 includes the second item ITM2 in the third area AR3 as illustrated in FIG. 9, while the second graphic interface GPI2 does not include the second item ITM2 in the third area AR3 as illustrated in FIG. 10. In other embodiments, the second graphic interface GPI2 may include, in the third area AR3, a symbol indicating that the second item ITM2 is in an inactive state. In this case, even if a user selects (for example, touches) the third area AR3, it is not detected as a valid user input, and the user terminal 150 does not generate the request unlocking of the door lock.

When the object detected by the doorbell 120 does not match one of the feature data units stored in the access management server 140, a visitor may be estimated to have a relatively lower reliability than the visitor having the visit history. According to an embodiment of the present disclosure, the access management server 140 may control the user terminal 150 to display the second graphic interface GPI2 that does not include the user interface (that is, ITM2) for selecting the unlocking of the door lock 130 when the visitor captured by the doorbell 120 does not have the visit history. Accordingly, when the visitor without the visit history is adjacent to the door lock 130, it is prevented that the user inadvertently selects to unlock the door lock 130, so the access management server 140 and/or the network system 100 providing improved security for locking and unlocking the door lock 130 may be provided.

Figure 11:
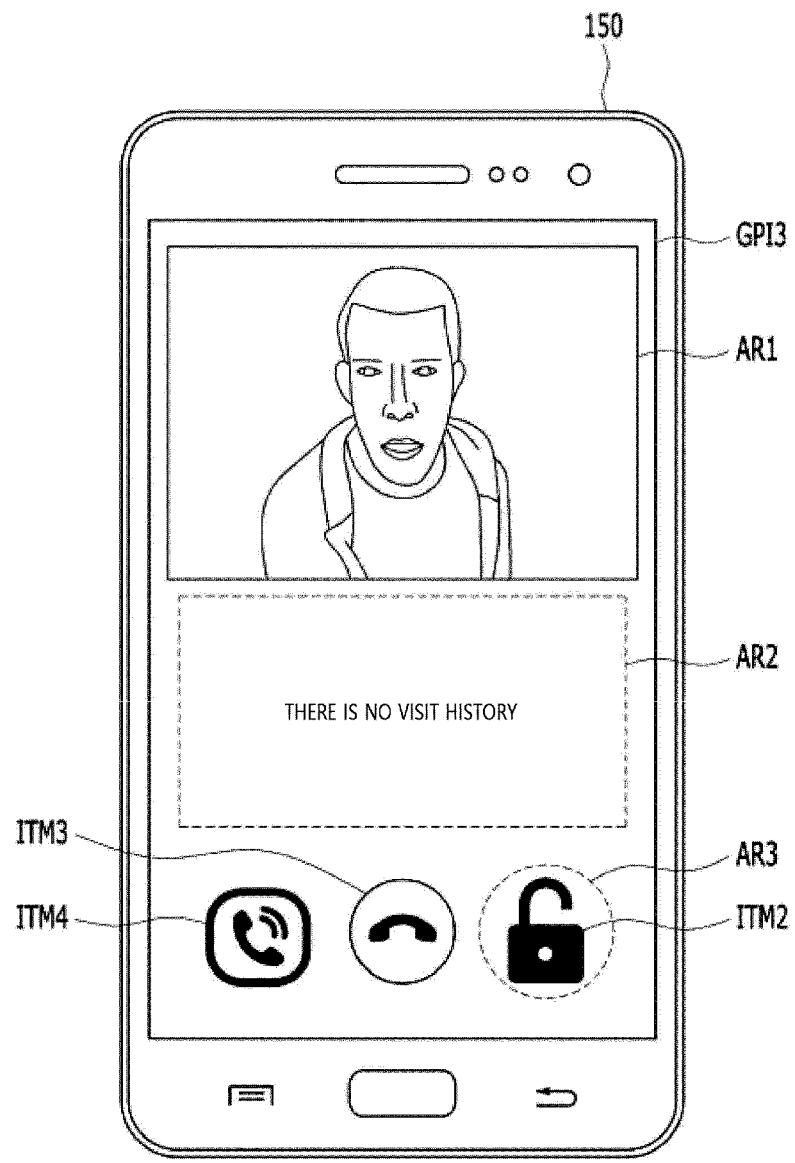
FIG. 11 is a diagram illustrating an embodiment of the graphic interface displayed on the user terminal when a user input for selecting a call with a visitor is received.

FIG. 11 is a diagram illustrating an embodiment of the graphic interface displayed on the user terminal when a user input for selecting a call with a visitor is received.

Referring to FIG. 11 together with FIG. 10, in response to the user input of selecting the first item ITM1 of the second graphic interface GPI2, the user terminal 150 may display a third graphic interface GPI3.

Like the second graphic interface GPI2, the third graphic interface GPI3 may include the first area AR1 and the second area AR2.

The first item ITM1 of the second graphic interface GPI2 may be changed to a fourth item ITM4 indicating that a call is currently being made on the third graphic interface GPI3. Like the second graphic interface GPI2, the third graphic interface GPI3 may include the first area AR1 and the second area AR2.

Unlike the second graphic interface GPI2, the third graphic interface GPI3 may include the second item ITM2 for selecting the unlocking of the door lock 130 in the third area AR3. The second item ITM2 may be activated after receiving the user input for selecting the first item ITM1. In other words, the second item ITM2 may be activated after the call between the doorbell 120 and the user terminal 150 is started.

Figure 12:
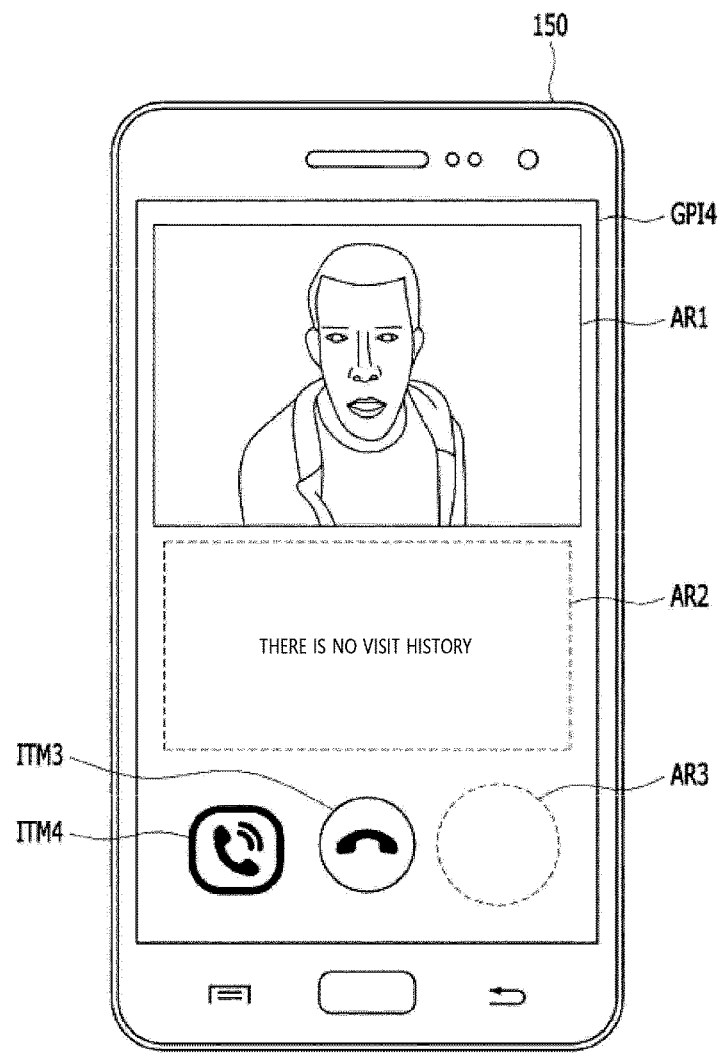
FIG. 12 is a diagram illustrating another embodiment of the graphic interface displayed on the user terminal when the user input for selecting the call with the visitor is received.
Figure 13:
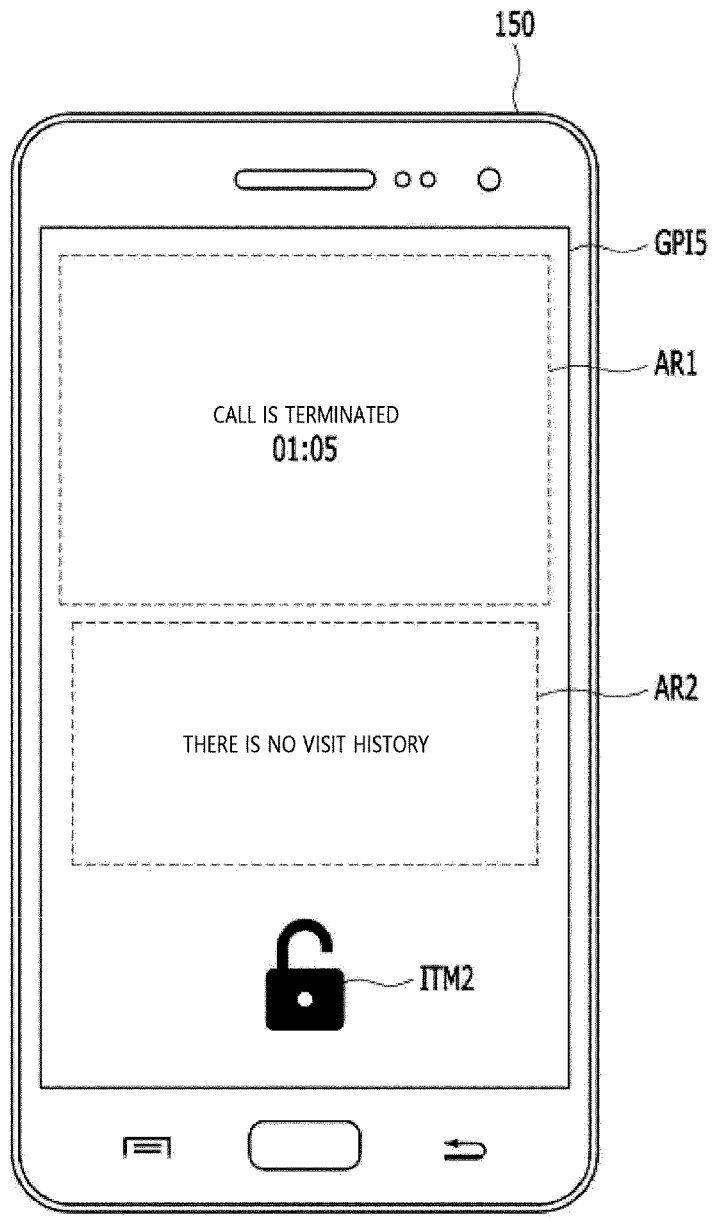
FIG. 13 is a diagram illustrating an embodiment of the graphic interface displayed on the user terminal when the user input for terminating the call with the visitor is received.

FIG. 12 is a diagram illustrating another embodiment of the graphic interface displayed on the user terminal when the user input for selecting the call with the visitor is received. FIG. 13 is a diagram illustrating an embodiment of the graphic interface displayed on the user terminal when the user input for terminating the call with the visitor is received.

Referring first to FIG. 12, a fourth graphic interface GPI4 is configured similarly to the third graphic interface GPI3 except for the third area AR3. In the third area AR3, the fourth graphic interface GPI4 does not include the second item ITM2 for selecting the unlocking of the door lock 130.

In response to the input of selecting the third item ITM3 of the fourth graphic interface GPI4, the user terminal 150 terminates the call with the doorbell 120.

Subsequently, referring to FIG. 13, in response to the input of selecting the third item ITM3 of the fourth graphic interface GPI4, a fifth graphic interface GPI5 may be displayed. The fifth graphic interface GPI5 may include a message such as "Call is terminated" and a message indicating duration of a call in the first area AR1, and the message similar to the fourth graphic interface GPI4 may be retained in the second area AR2.

The fifth graphic interface GPI5 may include the second item ITM2 for selecting the unlocking of the door lock 130. As such, the user terminal 150 may display the second item ITM2 for selecting unlocking of the door lock 130 after the call with the doorbell 120 is terminated. Accordingly, when a visitor without a visit history is adjacent to the door lock 130, it may be further prevented that the user unintentionally selects to unlock the door lock 130.

Figure 14:
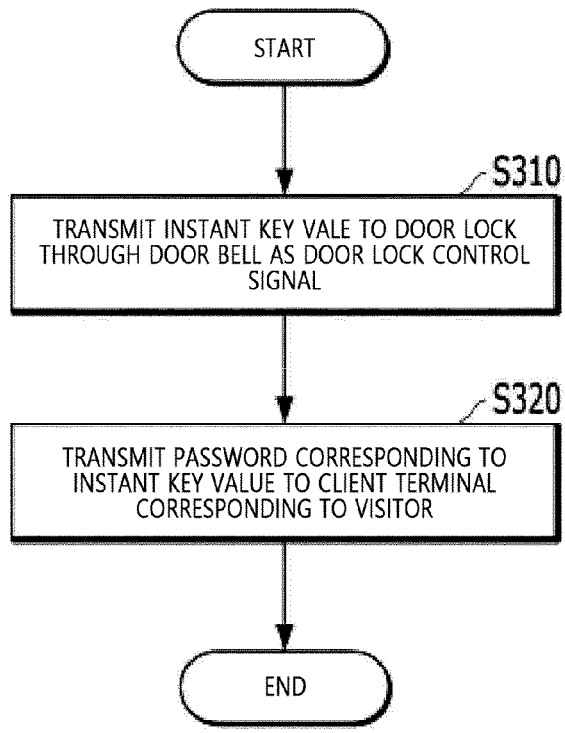
FIG. 14 is a flowchart illustrating a method for operating an access management server when a request unlocking of a door lock is received from the user terminal.

FIG. 14 is a flowchart illustrating an operation method of an access management server when a request unlocking of the door lock is received from the user terminal.

Referring to FIGS. 1 and 14, in step S310, the instant key value may be transmitted to the door lock 130 through the doorbell 120 as the door lock control signal (see S110 of FIG. 7). It will be appreciated that the instant key value may be generated according to various schemes. In embodiments, the instant key may be generated based on data associated with the user terminal 150. For example, the user terminal 150 may provide a seed for generating the instant key to the access management server 140. In embodiments, the instant key may be generated by the user terminal 150 and provided from the user terminal 150 to the access management server 140.

In step S320, the password corresponding to the instant key value may be transmitted to the client terminal 160 corresponding to the visitor. In embodiments, the password may be the same as the instant key value. As other examples, the password and the instant key value may have a relationship that may be converted in both directions or in one direction through various encryption/decryption algorithms. In embodiments, the password may be a one time password (OTP).

A visitor may input a password through the user interface of the door lock 130, and the door lock 130 may perform the locking and unlocking by verifying the input password using the instant key value.

Figure 15:
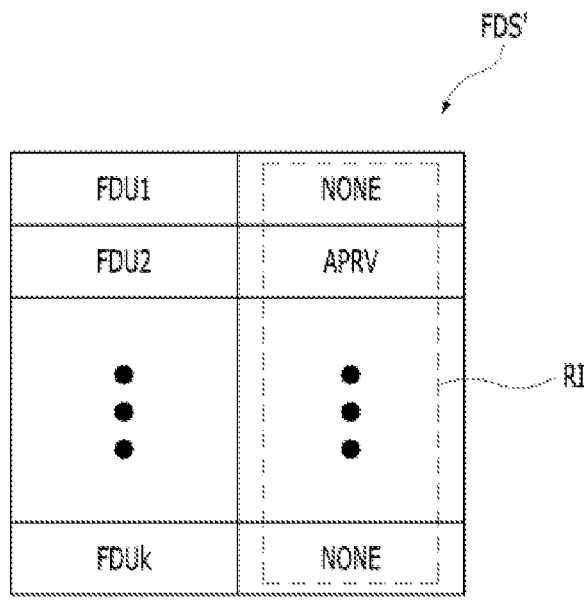
FIG. 15 is a diagram conceptually illustrating another embodiment of the feature data set of FIG. 3.

FIG. 15 is a diagram conceptually illustrating another embodiment of the feature data set of FIG. 3.

Referring to FIGS. 1 and 15, a feature data set FDS' may include first to k-th feature data units FDU1 to FDUk and registration information RI corresponding to each of them.

The registration information RI may be provided by a user of the user terminal 150 and included in the feature data set FDS'. The user terminal 150 receives each feature data unit and/or thumbnail image from the access management server 140, and the user may check the received feature data units and/or thumbnail images and optionally provide an object registration signal. In this way, the user may approve or disapprove the visitor according to whether the visitor of the thumbnail image is reliable. When the object registration signal is received, the access management server 140 may update the registration information (RI) of the corresponding feature data unit to indicate the approval state. For example, the registration information RI of the second feature data unit FDU2 is an approved state "APRV", and the registration information RI of each of the first feature data unit FDU1 and the k-th feature data unit FDUk is unapproved state "NONE".

Figure 16:
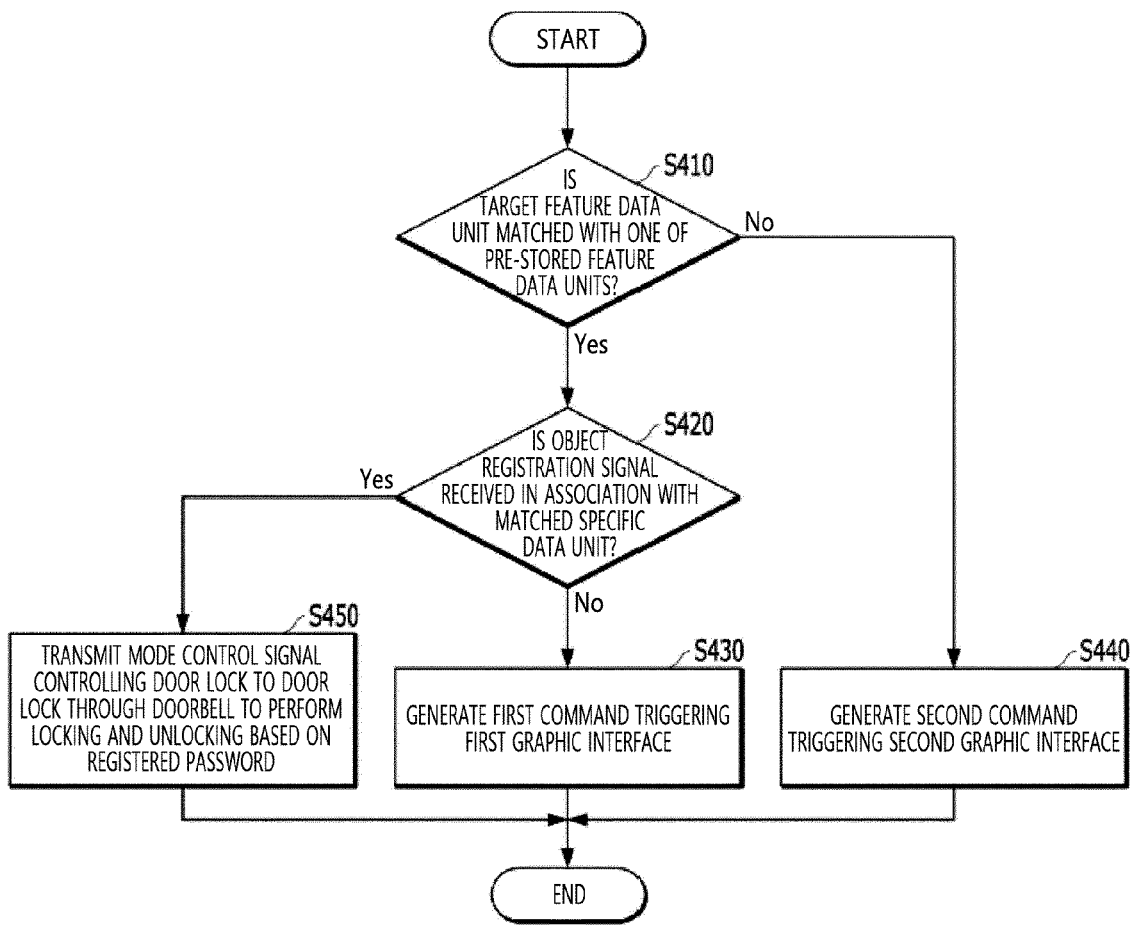
FIG. 16 is a flowchart illustrating another embodiment of step S104 of FIG. 7.

FIG. 16 is a flowchart illustrating another embodiment of step S104 of FIG. 7.

Referring to FIGS. 1 and 16, in step S410, it is determined whether the target feature data unit matches one of the feature data units stored in the database (DB). If so, step S420 is performed. If not, step S440 is performed.

In step S420, it is determined whether the object registration signal has been received in association with the matched feature data unit. It may be determined whether the object registration signal is received may be determined by inquiring the registration information RI of the feature data set FDS' (see FIG. 15). If not, step S430 may be performed. If so, step S450 is performed.

In step S430, the first command for triggering the first graphic interface is generated. In step S440, the second command for triggering the second graphic interface is generated. The first and second graphic interfaces are described similarly to the first and second graphic interfaces GPI1 and GPI2 described with reference to FIGS. 9 and 10, respectively.

In step S450, a mode control signal for controlling the door lock 130 to perform the locking and unlocking based on the registered password is transmitted to the door lock 130 through the doorbell 120. The door lock 130 performing the locking and unlocking based on the door lock control signal (see S110 of FIG. 7) may perform the locking and unlocking according to the registered password in response to the mode control signal.

The reception of the object registration signal from the user terminal 150 may mean that the corresponding visitor has relatively high reliability. According to an embodiment of the present disclosure, when the target feature data unit matches one of the feature data units stored in the database DB, and the object registration signal is received in association with the matched feature data unit, without the request unlocking of the door lock of the user terminal 150, the access management server 140 may control the door lock to perform the locking and unlocking based on the registered password In this case, as described with reference to FIG. 16, the access management server 140 may not trigger the display of the graphic interface on the user terminal 150, and therefore, may not provide the real-time video captured by the doorbell 120, and the functions such as the call between the doorbell 120 and the user terminal 150. Accordingly, while the user convenience is improved, resources consumed in the doorbell 120, the access management server 140, the user terminal 150, and/or the network system 100 may be reduced.

Figure 17:
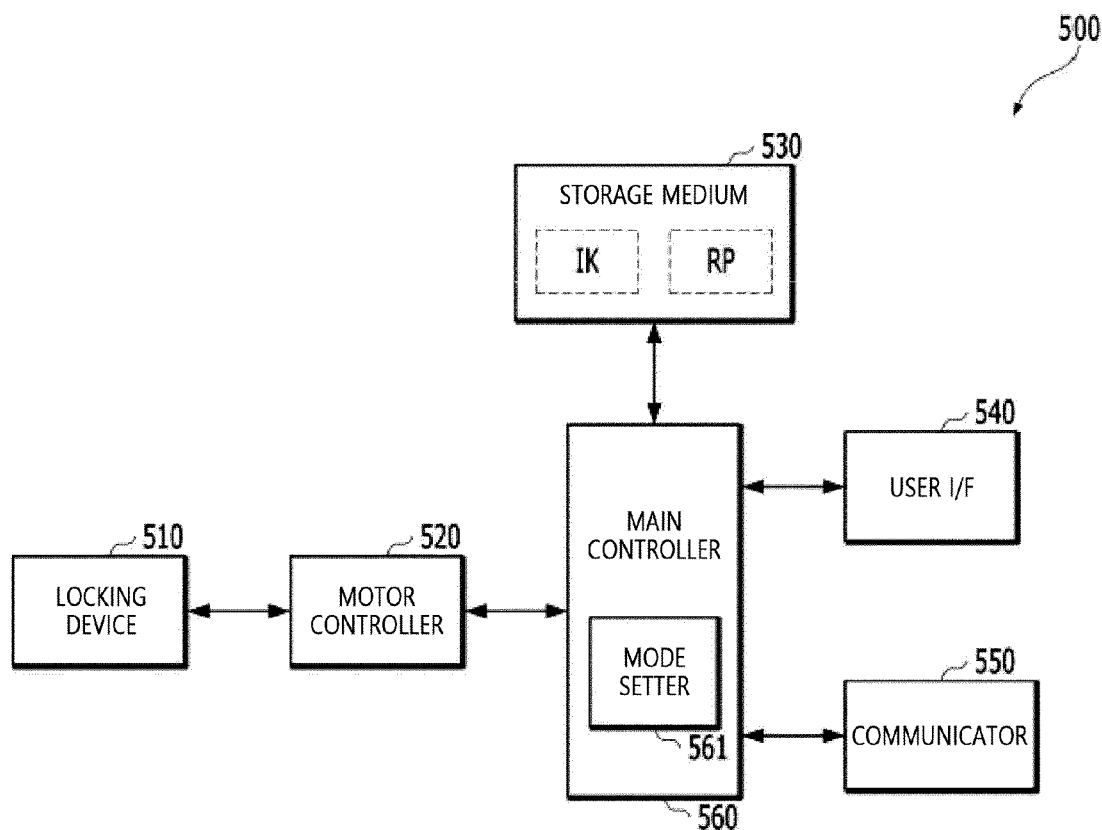
FIG. 17 is a block diagram illustrating an embodiment of the door lock of FIG. 1.

FIG. 17 is a block diagram illustrating an embodiment of the door lock of FIG. 1.

Referring to FIG. 17, the door lock 500 may include a locking device 510, a motor controller 520, a storage medium 530, a user interface 540, a communicator 550, and a main controller 560.

The motor controller 520 is connected to the main controller 560. The motor controller 520 is configured to control the locking and unlocking of the locking device 510 in response to the control signal from the main controller 560.

The storage medium 530 may be a nonvolatile storage medium. The storage medium 530 is configured to store an instant key value IK provided from the access management server (140, see FIG. 1), and a password RP registered by the user. In embodiments, the instant key value IK may not be stored in the storage medium 530, but may be temporarily stored in the working memory of the main controller 560. In embodiments, the registered password RP may be received through the user interface 540 and/or the communicator 550, and may be written to the storage medium 530 by the main controller 560.

The user interface 540 receives the user input for controlling the operations of the door lock 500 or the main controller 560. In embodiments, the user interface 540 may include a key pad, a touch pad, etc. for receiving a password from a visitor.

The communicator 550 may communicate with the doorbell 120 (see FIG. 1) in response to the control of the main controller 560. In embodiments, the communicator 550 may communicate with the doorbell 120 through the short range wireless communication such as Bluetooth communication, NFC, magnetic secure transmission communication, Zigbee communication, and infrared communication. In this way, when the door lock 500 is connected to the doorbell 120 through the short range wireless communication, an additional device for communicating with the router 110 of FIG. 1 that provides a connection to the network 105, for example, the Wi-Fi device may be omitted, and accordingly, the manufacturing cost of the door lock 500 may be reduced.

The main processor 560 controls the overall operations of the doorbell 500. The main controller 560 may verify the password received through the user interface 540, and control the motor controller 520 according to the verification result to control the locking and unlocking of the locking device 510.

In the first verification mode, the main controller 560 may verify the password received through the user interface 540 based on the instant key value IK. In the second verification mode, the main controller 560 may verify the password received through the user interface 540 based on the registered password RP.

A mode setter 561 configured to select one of the first verification mode and the second verification mode may be provided. In FIG. 17, the mode setter 561 is illustrated as a component included in the main controller 560. However, this is illustrative and the embodiments are not limited thereto. The mode setter 561 may be provided as a separate component from the main controller 560.

In embodiments, the main controller 560 may operate in the first verification mode as a default state. When the mode control signal is received from the access management server 140, the mode setter 561 may cause the main controller 560 to operate in the second verification mode. In embodiments, when a predetermined time elapses from the time the mode control signal is received, the mode setter 561 may return from the second verification mode to the first verification mode. In other embodiments, when the failure of verification according to the registered password RP is repeated and reaches a threshold number of times, the mode setter 561 may return to the first verification mode from the second verification mode.

Figure 18:
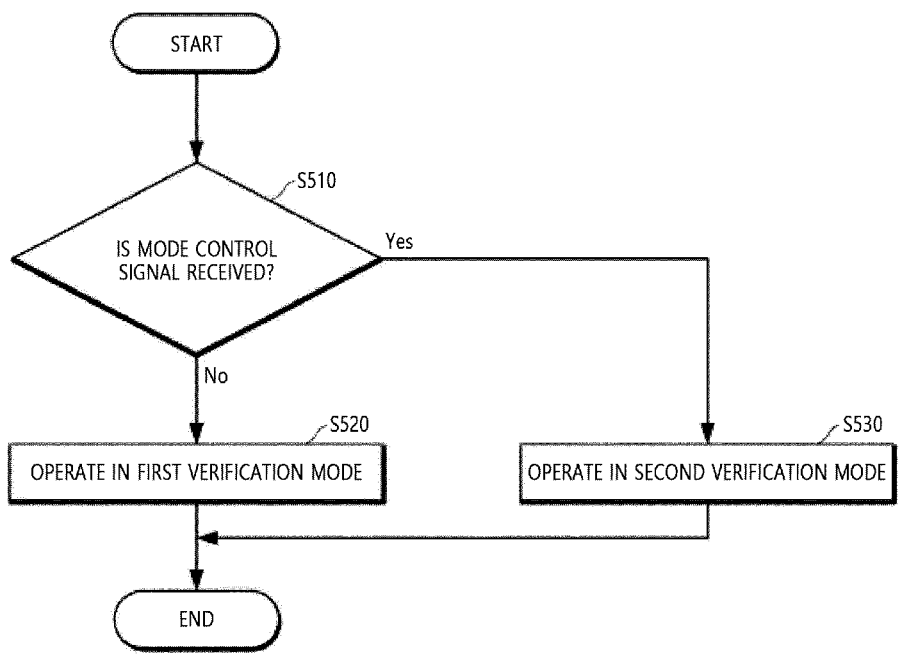
FIG. 18 is a flowchart illustrating a method of operating a door lock.

FIG. 18 is a flowchart illustrating a method of operating a door lock.

Referring to FIGS. 17 and 18, in step S510, step S520 or step S530 is performed depending on whether the mode control signal is received from the access management server 140.

In step S520, the door lock 500 operates in the first verification mode. This will be described in detail with reference to FIG. 19.

In step S520, the door lock 500 operates in the second verification mode. This will be described in detail with reference to FIG. 20.

Figure 19:
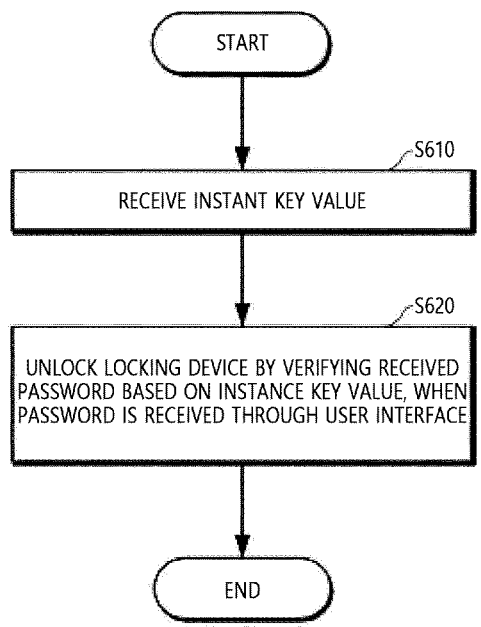
FIG. 19 is a flowchart illustrating an embodiment of step S520 of FIG. 18.

FIG. 19 is a flowchart illustrating an embodiment of step S520 of FIG. 18.

Referring to FIGS. 17 and 19, in step S610, the door lock 500 receives the instant key value IK.

In step S620, the door lock 500 unlocks the locking device 510 by verifying the received password based on the instant key value IK when the password is received through the user interface 540.

Since the instant key value IK is generated in response to the user's selection of the user terminal 150 as described above, the verification of the password based on the instant key value IK may provide a high security level.

Figure 20:
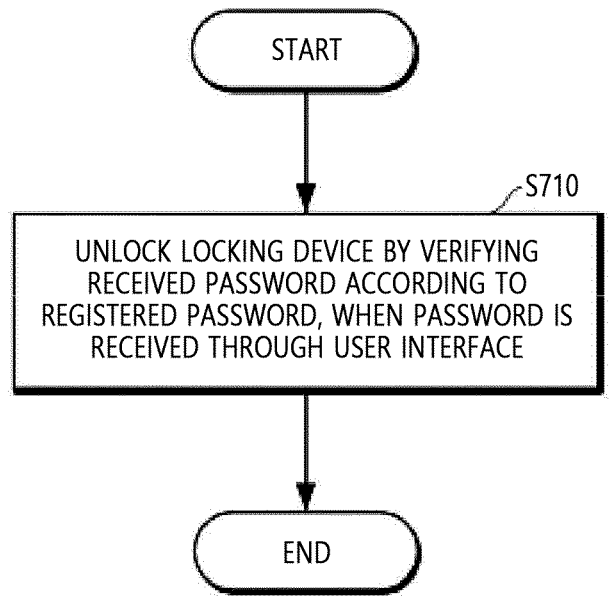
FIG. 20 is a flowchart illustrating an embodiment of step S530 of FIG. 18.

FIG. 20 is a flowchart illustrating an embodiment of step S530 of FIG. 18.

Referring to FIGS. 17 and 20, in step S710, when the password is received through the user interface 540, the door lock 500 verifies the received password according to the registered password (RP), and unlocks the locking device 510.

Since the locking device 510 is unlocked without the user's selection of the user terminal 150, the verification of the password based on the registered password RP may improve the user convenience.

Figure 21:
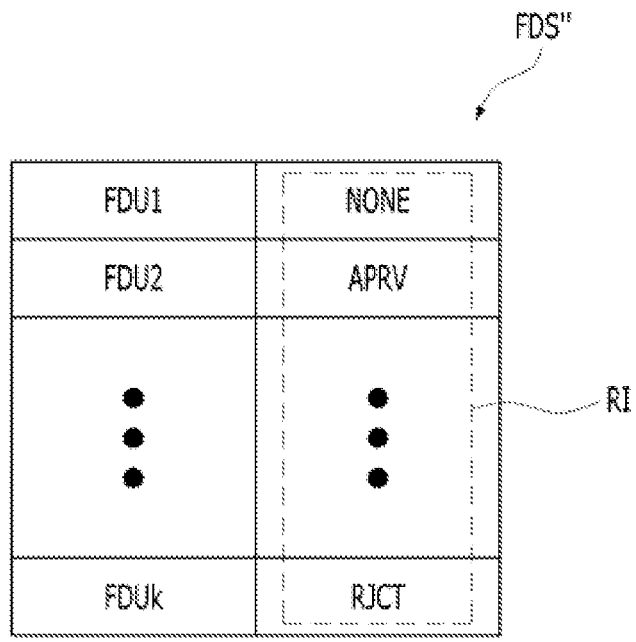
FIG. 21 is a diagram conceptually illustrating another embodiment of the feature data set of FIG. 3.

FIG. 21 is a diagram conceptually illustrating another embodiment of the feature data set of FIG. 3.

Referring to FIGS. 1 and 21, a feature data set FDS" may include first to k-th feature data units FDU1 to FDUk and registration information RI corresponding to each of them.

The registration information RI may be provided by the user of the user terminal 150 and included in the feature data set FDS'. The user terminal 150 receives each feature data unit and/or thumbnail image from the access management server 140, and the user may check the received feature data units and/or thumbnail images and optionally provide a first object registration signal or a second object registration signal. When the first object registration signal is received, the access management server 140 may update the registration information (RI) of the corresponding feature data unit to indicate the approval state. When the second object registration signal is received, the access management server 140 may update the registration information (RI) of the corresponding feature data unit to indicate the reject state. For example, the registration information RI of the first feature data unit FDU1 is a non-approved state "NONE", the registration information RI of the second feature data unit FDU2 is an approved state "APRV", and the registration information RI of the k-th feature data unit FDUk is a reject state "RJCT". As such, the registration information RI may indicate one of various types of states.

Figure 22:
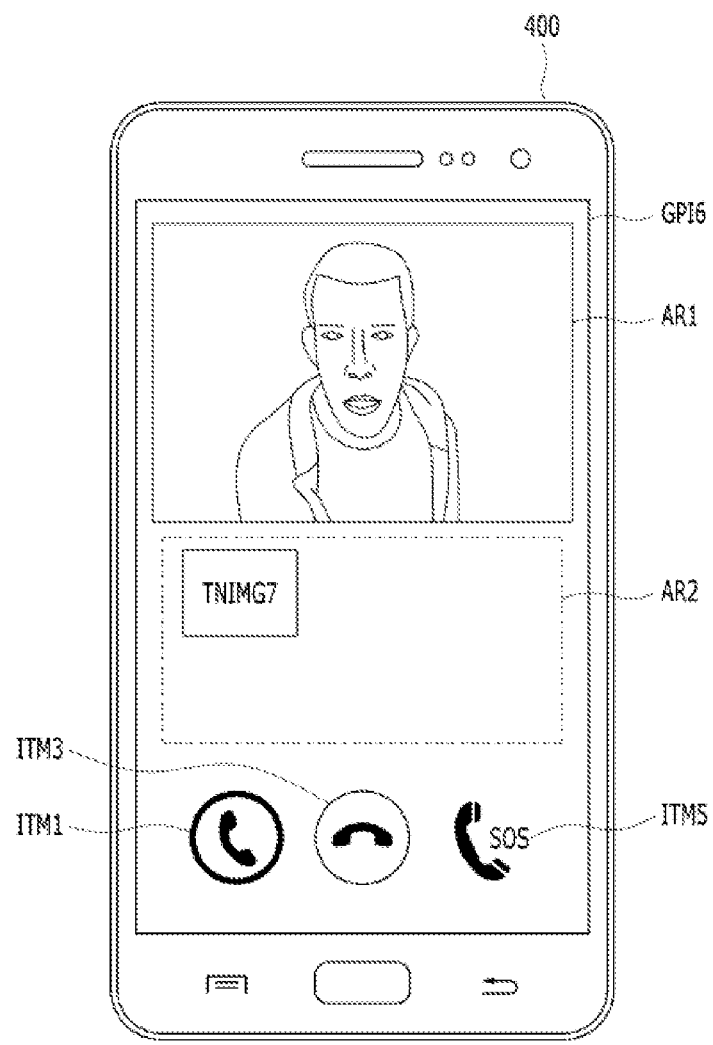
FIG. 22 is a diagram illustrating an embodiment of the graphic interface displayed on the user terminal when a third command is received from the access management server.

FIG. 22 is a diagram illustrating an embodiment of the graphic interface displayed on the user terminal when the third command is received from the access management server.

Referring to FIG. 22 together with FIG. 16, in step S420, the access management server 140 may perform step S450 when the first object registration signal is received in association with the matched feature data unit. On the other hand, when the second object registration signal is received in association with the matched feature data unit, the access management server 140 may generate a third command for triggering a sixth graphic interface (GPI6).

The user terminal 150 may display the sixth graphic interface GPI6 in response to the third command. The sixth graphic interface GPI6 may include the first area AR1 and the second area AR2. The real-time video captured by the doorbell 120 may be displayed in the first area AR1. The existence of the feature data unit matching the object detected by the doorbell 120 means that the visit history of the corresponding visitor exists. A thumbnail image TNIMG7 may be displayed in the second area AR2.

The sixth graphic interface GPI6 may further include the first item ITM1 for selecting the call with the doorbell 120 and the third item ITM3 for rejecting and/or terminating the call. Also, the sixth graphic interface GPI6 may further include a fifth item ITM5 for selecting a call with a predetermined contact (for example, an emergency contact). In response to the user input of selecting the fifth item ITM5, the user terminal 150 may call a predetermined contact number. Accordingly, when a visitor that a user determines as a dangerous person is adjacent to the door lock 130, the user of the user terminal 150 may quickly make a call with a predetermined contact. The sixth graphic interface GPI6 does not include the user interface for selecting the unlocking of the door lock 130.

Figure 23:
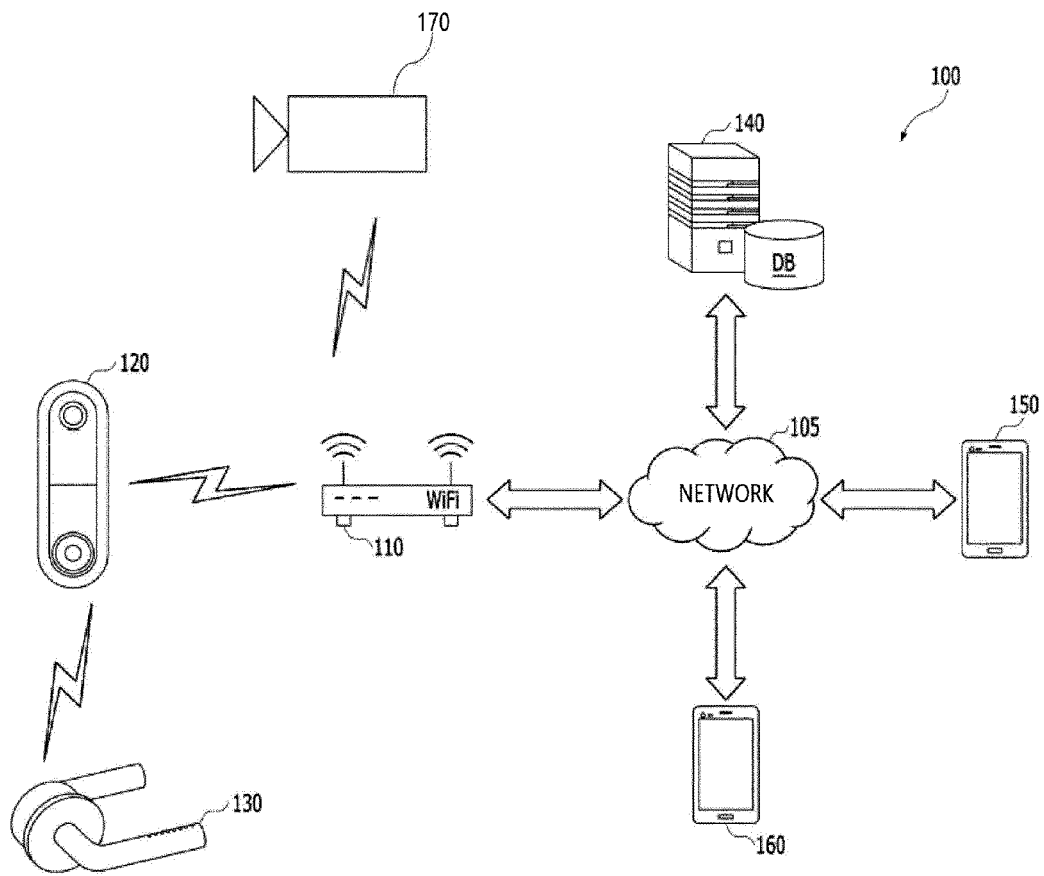
FIG. 23 is a block diagram illustrating a network system according to another embodiment of the present disclosure.

FIG. 23 is a block diagram illustrating a network system according to another embodiment of the present disclosure.

In the network system of FIG. 23, other parts (a network, a router, a door lock, an access control server, and a user terminal) are the same except for the case where the doorbell including the camera is separately implemented as a camera and a doorbell in the network system of FIG. 1. Accordingly, hereinafter, the parts different from FIG. 1 will be mainly described, and descriptions of the same components as those of FIG. 1 will be omitted, and these parts will be made to the parts described in FIG. 1.

First, the camera 170, which is a component of the network system of FIG. 23, may include a camera module 171, a wireless communication unit 172, and a control unit 173.

Figure 24:
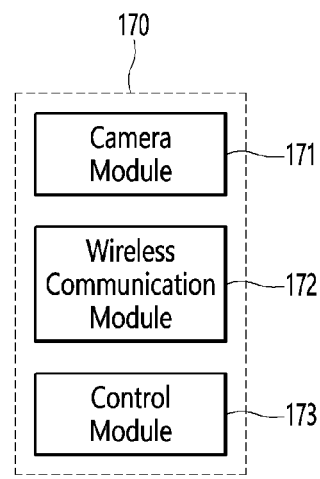
FIG. 24 is an internal block diagram of a camera according to an embodiment of the present disclosure.

FIG. 24 is an internal block diagram of a camera according to an embodiment of the present disclosure.

The camera module 171 acquires an image of an area to be captured.

More specifically, the camera module may detect an object (e.g., a face) from the captured image, and generate a specific data unit representing features of the detected object. In addition, the camera module may transmit the generated specific data unit to the server.

The wireless communication unit 172 may perform data communication with an external device (a doorbell, a user terminal, a server, etc.) through a network. The wireless communication unit 172 may transmit the captured image to an external server or receive a user's control command.

The wireless communication unit 172 may include Bluetooth, wireless fidelity (Wi-Fi), near field communication (NFC), wireless broadband Internet (Wibro), ultra-wideband communication, and a wireless communication module such as Sub-1G, ZigBee, and LoRa, and the like.

The controller 173 may control operations of all units constituting the camera 170.

In addition, the camera 170 may include a power supply unit, and the power supply unit may receive power from the outside to supply power to all components of the camera 170.

Figure 25:
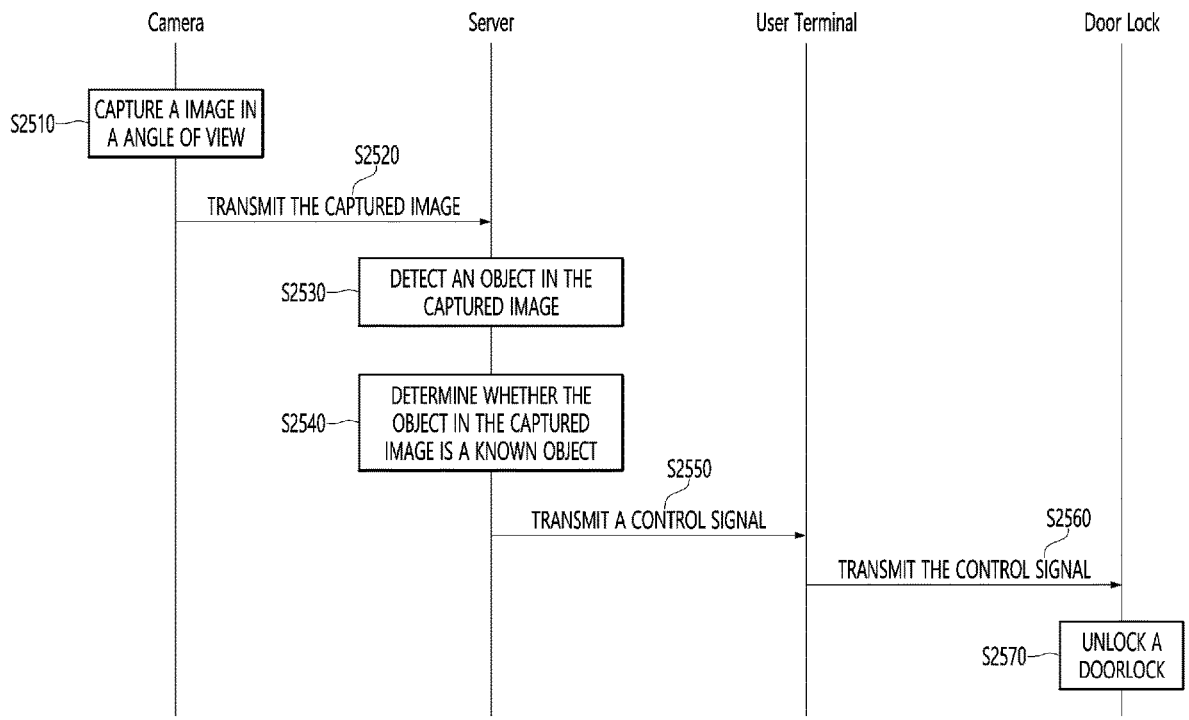
FIG. 25 is a flowchart illustrating an example of a method for controlling a door lock through a graphic interface according to an embodiment of the present disclosure.

FIG. 25 is a flowchart illustrating an example of a method for controlling a door lock through a graphic interface according to an embodiment of the present disclosure.

More specifically, FIG. 25 relates to a method for controlling a door lock when the network system of FIG. 23, that is, the doorbell and the camera are implemented separately.

The camera, doorbell, door lock, and user terminal in the network system of FIG. 25 are connected to each other through wired/wireless communication.

First, the camera captures an image within an angle of view (S2510).

Then, the camera transmits the captured image to the server (S2520). The server detects an object (e.g., a face and a person) in the captured image received from the camera (S2530). Then, the server compares the detected object with an object or information related to a pre-stored (or pre-registered) object in the server to determine whether the detected object is a known object or an unknown object (S2540).

Based on the determination result, the server transmits a control signal to the user terminal so that a first user interface (UI) including a door unlock button or a second UI not including a door unlock button may be output to the user terminal (S2550).

As a result of the determination, when the object is the known object, the server transmits the control signal to the user terminal so that the user terminal outputs the first UI including the door unlock button.

The first user interface may be displayed as illustrated in FIG. 9, and the second user interface may be displayed as illustrated in FIG. 10, and the door unlock button may mean a second item for selecting unlocking of the above-described door lock.

As a result of the determination, when the object is the unknown object, the server transmits the control signal to the user terminal so that the user terminal outputs the second UI not including the door unlock button.

Thereafter, when the first UI is output to the user terminal and the door unlock button in the first UI is selected by the user, the user terminal transmits a control signal for instructing unlocking the door lock to a doorbell or a door lock (S2560).

Thereafter, when the door lock receives a control signal instructing unlocking of the door lock, the door lock unlocks the door (S2570).

When the doorbell receives the control signal instructing the unlocking of the door lock, the doorbell transmits the control signal instructing the unlocking of the door lock to the door lock, and the door lock unlocks the door based on the control signal instructing the unlocking of the door lock received from the doorbell.

First Embodiment: Application to Hotel Solution

A first embodiment relates to an embodiment that applies, to a hotel solution, a method for controlling a door lock according to whether a UI including a door unlock button or a UI not including a door unlock button is output according to a result of recognizing an object in an image captured by a camera proposed in the present specification.

First, the camera captures an image in front of the hotel door.

Then, the camera transmits the captured image to the server in the hotel.

And, the server detects an object in the captured image received from the camera, and when the detected object is the known object, the server transmits, to the user terminal or a hotel staff terminal, a control signal for controlling to output the UI including the door unlock button to the user terminal or the hotel staff terminal.

The object may be a human face, a person, or the like.

That is, when the UI including the door unlock button is output to the user terminal or the hotel staff terminal, and a user input for the door unlock button is received in the output UI, the user terminal transmits the control signal instructing the unlocking of the door lock to the door lock or door bell, and the door lock unlocks the door.

Additionally, the server may output, to the user terminal or the hotel staff terminal, the UI related to whether the user terminal or the hotel staff terminal includes an unlock button includes hotel service information provided from the hotel, including the hotel service information provided from the hotel.

For example, as a result of recognizing an object in front of a hotel visit through a camera in a hotel, the server may provide different hotel service information to the user terminal or the hotel staff terminal depending on whether the information registered when checking in at the hotel front or information detected in the parking lot of the hotel is the same as the information of the recognized object.

If not the same, the server may provide, to the user terminal or the hotel staff terminal, information registered at the time of check-in to an object in front of a hotel door together with the UI not including the door unlock button or hotel service information corresponding to the information detected in the parking lot of the hotel, together with the UI not including the door unlock button. For example, when the recognized object is a person, a person may be mistaken or find the wrong room for his/her stay, so the server may provide a hotel room number, guide information that helps to find a hotel room, and the like to the user terminal or the hotel staff terminal in order to help a person find the right hotel room for his/her stay.

If the same, the server may provide the hotel service information including user convenience information provided from the corresponding hotel room together with the UI including the door unlock button to the user terminal.

The user convenience information may include availability and hours of use a fitness center in a hotel and a use time, availability and hours of use of a sauna, availability and hours of massage, hotel restaurant type/location/hours of use, a hotel check-out time, items available in a hotel room according to a grade (VIP, gold, silver, general, etc.) registered in the hotel and cost to be paid when using the items, discount coupons applied when using items according to the grade, and the like.

Next, a method for controlling a door lock according to the UI proposed in this specification in an unmanned hotel that does not check-in separately at the hotel front will be described.

In the case of the unmanned hotel, since there is no separate registration procedure such as check-in at a hotel front desk, the server may compare the object recognized through the camera around the hotel room with pre-registered information related to the recognized object to determine whether the recognized object is the known object or the unknown object, and as the result of determination, provide the above-described first UI or second UI to the user terminal together with the hotel service information.

Here, the pre-registered information related to the recognized object may be information on an object pre-registered through an application such as a mobile phone, or information on an object related to a vehicle number captured by a camera in a parking lot of a hotel before a certain time.

That is, when the object recognized through the camera around the hotel room is the same as the object pre-registered through the above-described application or the object related to the vehicle number captured in the parking lot, the server may provide the first UI including the door unlock button as illustrated in FIG. 9 to the user terminal, and the first UI may include the hotel service information.

In this case, the hotel service information corresponds to the user convenience information related to the user convenience in the hotel room, and may include availability and hours of use a fitness center in a hotel and a use time, availability and hours of use of a sauna, availability and hours of massage, hotel restaurant type/location/hours of use, a hotel check-out time, items available in a hotel room according to a grade (VIP, gold, silver, general, etc.) registered in the hotel and cost to be paid when using the items, discount coupons applied when using items according to the grade, and the like.

Here, the grade registered in the hotel may be determined based on the number of times of visits to the hotel during a specific period, expenses paid at the hotel, payment details, and the like.

In relation to the user convenience information, when the server detects that the door lock is unlocked, the server may transmit a control signal to the user terminal to automatically activate a wireless communication technology such as Wi-Fi that may be used in the hotel room.

Alternatively, when the object recognized by the camera around the hotel room is not the same as the object pre-registered through the above-described application or the object related to the vehicle number taken in the parking lot, the server provides the second UI illustrated in FIG. 10 to the user terminal, and the second UI may include hotel service information including a hotel room number in which the object is registered, a hotel room location, guide information related to how to get to the hotel room, and the like.

In another embodiment, as a result of the server recognizing the object in front of the hotel room through the camera, when the object is a person, and the object is an object that should not be stayed in a hotel, such as a minor, a criminal, or an infected person (person infected with highly contagious diseases, such as those with COVID-19), the server may provide a UI that does not include a door unlock button as shown in FIG. 10 to the user terminal, and at the same time, may transmit a warning notification message to an institution or the like which may take follow-up actions on the recognized object by referring to information pre-stored in the server. Here, it is assumed that the server pre-registers or stores personal information on a person related to the object.

More specifically, the institution that may take the follow-up actions may be, for example, a parent, a police station, or the like when the recognized object is a minor, the institution may be a police station when the object is a criminal, and the institution may be a police station, or the like when the object is an infected person, the institution may be a fire department, a hospital emergency room, a disease control agency, or the like.

Second Embodiment: Application to Unmanned Retail Shop Solution

A second embodiment relates to an embodiment in which the contents described in the first embodiment described above are applied to a solution of an unmanned retail shop other than the hotel or the unmanned hotel, and only the parts that are different from the first embodiment are described, and other parts will be made to the contents described in the first embodiment.

That is, as a result of recognizing an object captured by a camera existing in or around an unmanned retail shop, when the recognized object is the same as a pre-stored or registered object, a server may provide a control signal to a user terminal to output a UI including a door unlock button to the user terminal as illustrated in FIG. 9 capable of unlocking the door lock of the unmanned retail shop In this case, the server may provide service information provided by the unmanned retail shop as described in the first embodiment together with the first UI.

Here, the service information provided from the unmanned retail shop may include expiration date information of products provided or sold by the unmanned retail shop, information on products that can be discounted, information on coupons related to products, and the like.

Figure 26:
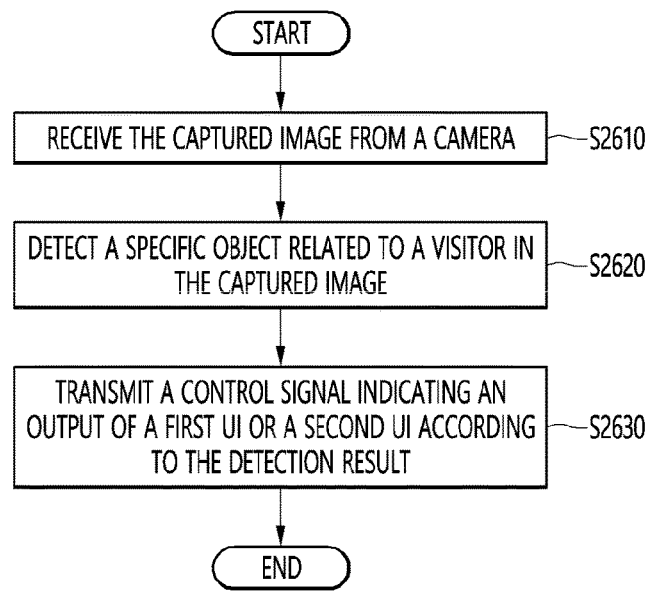
FIG. 26 is a flowchart illustrating an example of a method for controlling a door lock proposed in the present specification.

FIG. 26 is a flowchart illustrating an example of a method for controlling a door lock proposed in the present specification.

That is, FIG. 26 illustrates a method for controlling whether the door lock is locked according to a user interface displayed on the user terminal.

First, the server receives an image captured from the camera (S2610).

Then, the server recognizes a specific object related to a visitor from the received captured image (S2620).

The specific object may be a face of the visitor.

Here, when the recognition result of the specific object indicates that the visitor is an acquaintance, the server transmits a first control signal instructing to output a first user interface to the user terminal.

Alternatively, when the recognition result of the specific object indicates that the visitor is not an acquaintance, the server transmits the first control signal instructing to output the second user interface to the user terminal.

More specifically, a step of recognizing the specific object may be performed through a step of determining whether the specific object related to the visitor in the captured image matches any one of specific data units of a pre-stored database. The specific details thereof will refer to the contents described above.

When the specific object matches any one of the specific data units, the visitor may be an acquaintance, and when the specific object does not match any one of the specific data units, the visitor may not be an acquaintance.

The server transmits the first control signal instructing to output the first user interface including a door unlock item for performing unlocking of a door lock or the second user interface not including the door unlock item based on the recognition result of the specific object (S2630).

Additionally, when the door unlock item is selected in the first user interface, the server may transmit a second control signal for unlocking the door lock to the door lock through a doorbell.

Here, a step of transmitting the second control signal includes a step of transmitting an instant key value as the second control signal to the door lock through the doorbell and a step of transmitting a password corresponding to the instant key value to the user terminal.

The door lock may be unlocked when the password corresponding to the instant key value is verified based on the instant key value.

In addition, the server illustrated in FIG. 3 may be implemented to perform the method of FIG. 26 described above, which is specifically as follows.

That is, the server illustrated in FIG. 3 may include a process configured to communicate with a communicator connected to a network and a user terminal connected to the network through the communicator to control the door lock using a user interface displayed on the user terminal.

Specifically, the processor of the server receives an image captured from a camera, recognizes a specific object related to a visitor in the received captured image, and controls to transmit the first control signal instructing to output the first user interface including the door unlock item for performing the unlocking of the door lock or the second user interface not including the door unlock item based on the recognition result of the specific object to the user terminal.

Although specific embodiments and application examples have been described here, this is only provided to help a more general understanding of the present disclosure, and the present disclosure is not limited to the above embodiment and is common in the field to which the present disclosure belongs, and may be variously modified and modified from these descriptions by those of ordinary skill in the field to which the present disclosure pertains.

Therefore, the spirit of the present invention should not be limited to these exemplary embodiments, but the claims and all of modifications equal or equivalent to the claims are intended to fall within the scope and spirit of the present invention.

What is claimed is:

1. A method for controlling a door lock using a user interface displayed on a user terminal, the method comprising:
   receiving an image captured from a camera;
   recognizing a specific object related to a visitor from the received captured image;
   transmitting a first control signal instructing to output a first user interface including a door unlock item for performing unlocking of the door lock or a second user interface not including the door unlock item based on the recognition result of the specific object;
   wherein, when the recognition result of the specific object indicates that the visitor is an acquaintance, the first control signal instructing to output the first user interface is transmitted to the user terminal;
   transmitting a second control signal for unlocking the door lock to the door lock through a doorbell when the door unlock item is selected in the first user interface; and
   wherein, the transmitting of the second control signal includes:
   transmitting an instant key value as the second control signal to the door lock through the door bell; and
   transmitting a password corresponding to the instant key value to the user terminal.

2. The method of claim 1, wherein, when the recognition result of the specific object indicates that the visitor is not an acquaintance, the first control signal instructing to output the second user interface is transmitted to the user terminal.

3. The method of claim 1, wherein, the recognizing of the specific object includes determining whether the specific object related to the visitor in the captured image matches any one of specific data units of a pre-stored database.

4. The method of claim 3, wherein
   when the specific object matches any one of the specific data units, the visitor is the acquaintance; and
   the visitor is not the acquaintance when the specific object does not match any one of the specific data units.

5. The method of claim 1, wherein the door lock is unlocked when the password corresponding to the instant key value is verified based on the instant key value.

6. The method of claim 1, wherein the specific object is a face of the visitor.

7. A server for controlling a door lock using a user interface displayed on a user terminal, the method comprising:
   a communicator configured to be connected to a network;
   a processor configured to communicate with the user terminal connected to the network through the communicator, wherein the processor receives an image captured from a camera, recognizes a specific object related to a visitor from the received captured image, and transmits a first control signal instructing to output a first user interface including a door unlock item for performing unlocking of the door lock or a second user interface not including the door unlock item based on the recognition result of the specific object;
   wherein the processor controls to transmit the first control signal instructing to output the first user interface to the user terminal when the recognition result of the specific object indicates that the visitor is an acquaintance;
   wherein the processor controls to transmit a second control signal for unlocking the door lock to the door lock through a doorbell when the door unlock item is selected in the first user interface; and
   wherein the processor transmits an instant key value as the second control signal to the door lock through the door bell, and
   controls to transmit a password corresponding to the instant key value to the user terminal and controls to transmit the second control signal.

8. The server of claim 7, wherein the processor controls to transmit the first control signal instructing to output the second user interface to the user terminal when the recognition result of the specific object indicates that the visitor is not an acquaintance.

9. The server claim 7, wherein the processor controls to determine whether the specific object related to the visitor in the captured image matches any one of specific data units of a pre-stored database to perform the recognition of the specific object.

10. The server of claim 9, wherein, when the specific object matches any one of the specific data units, the visitor is the acquaintance; and
   the visitor is not the acquaintance when the specific object does not match any one of the specific data units.

11. The server of claim 7, wherein the door lock is unlocked when the password corresponding to the instant key value is verified based on the instant key value.

* * * * *